H. C. WILSON & C. R. B. CLAFLIN.
SIGNALING SYSTEM.
APPLICATION FILED AUG. 27, 1907.

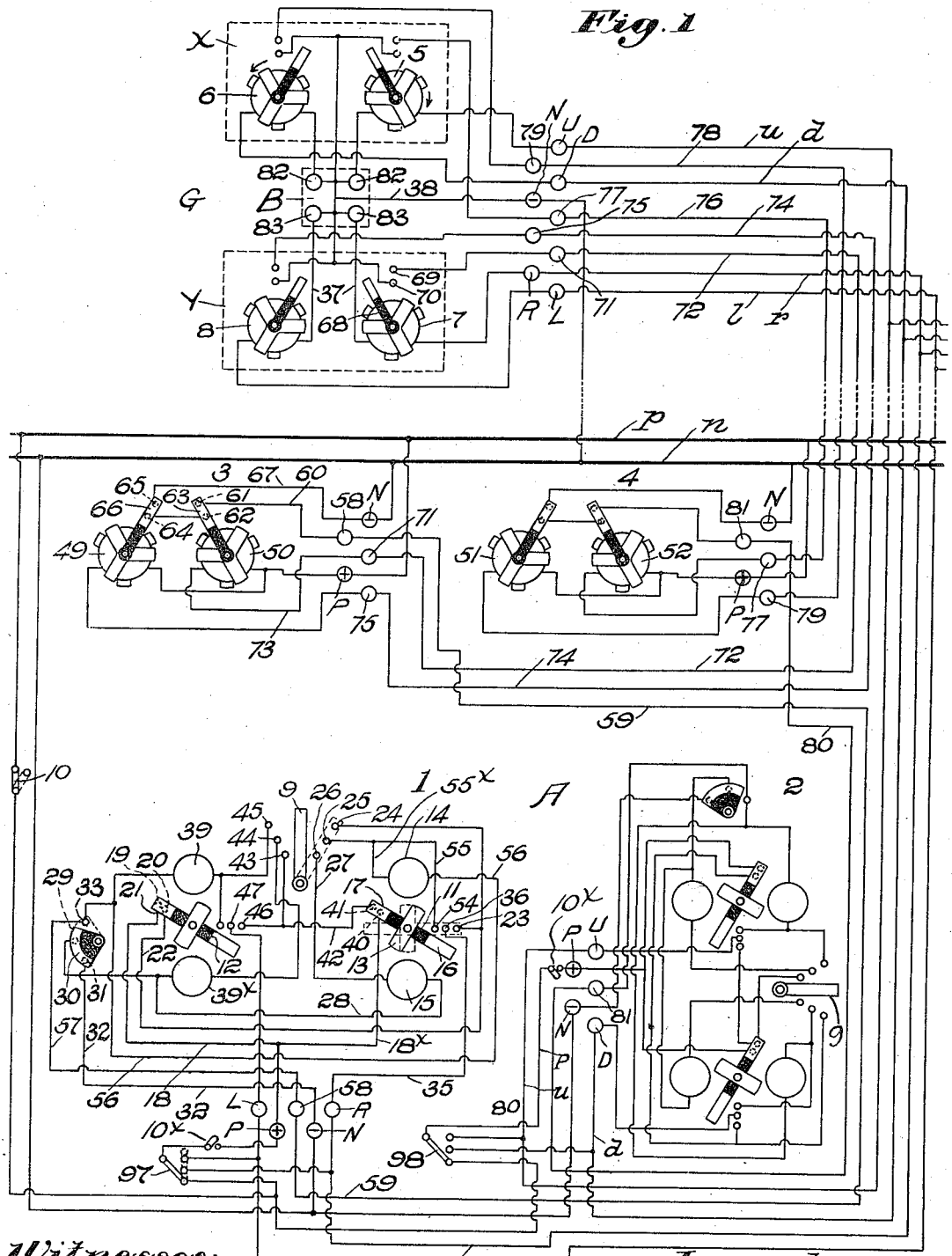

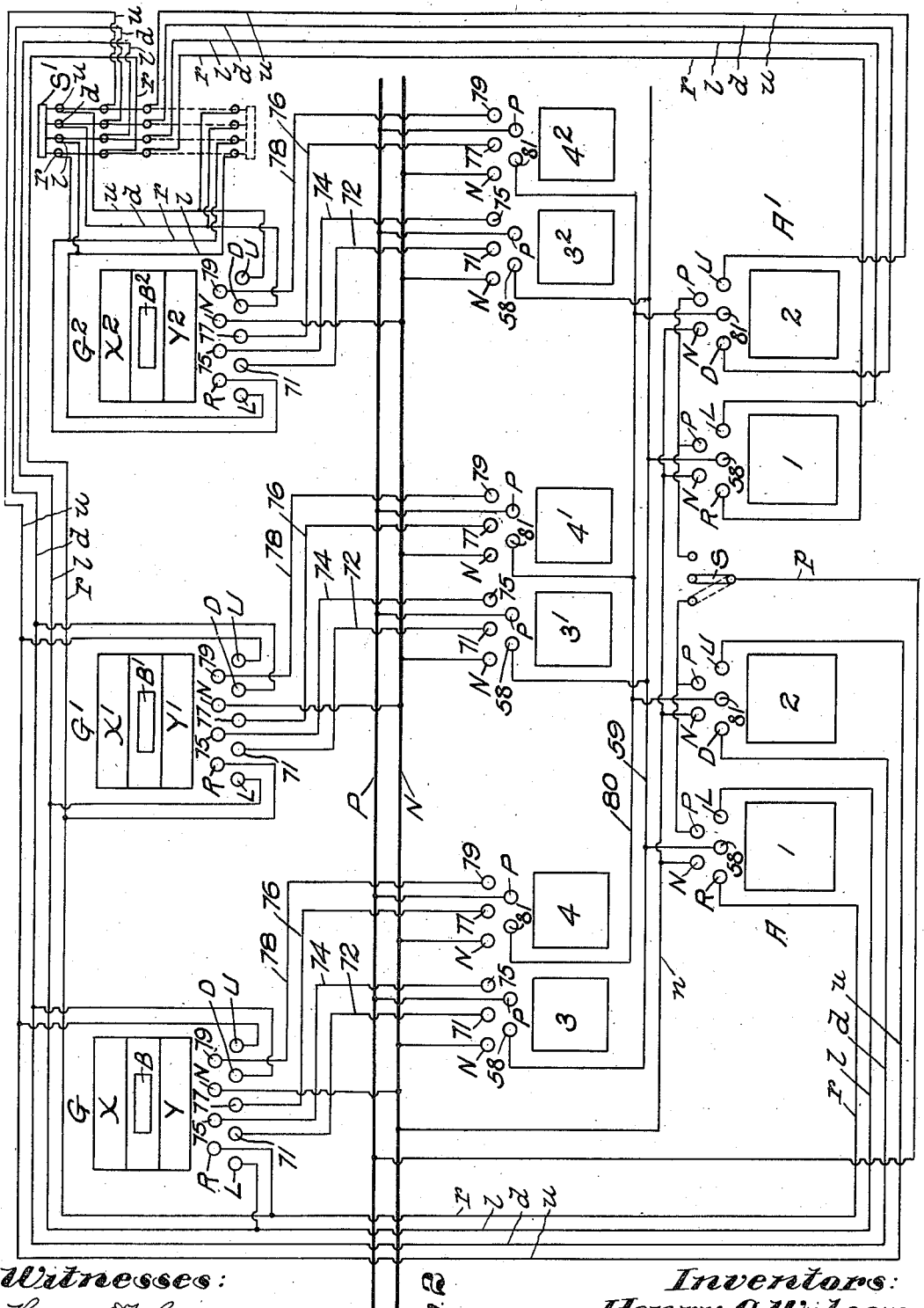

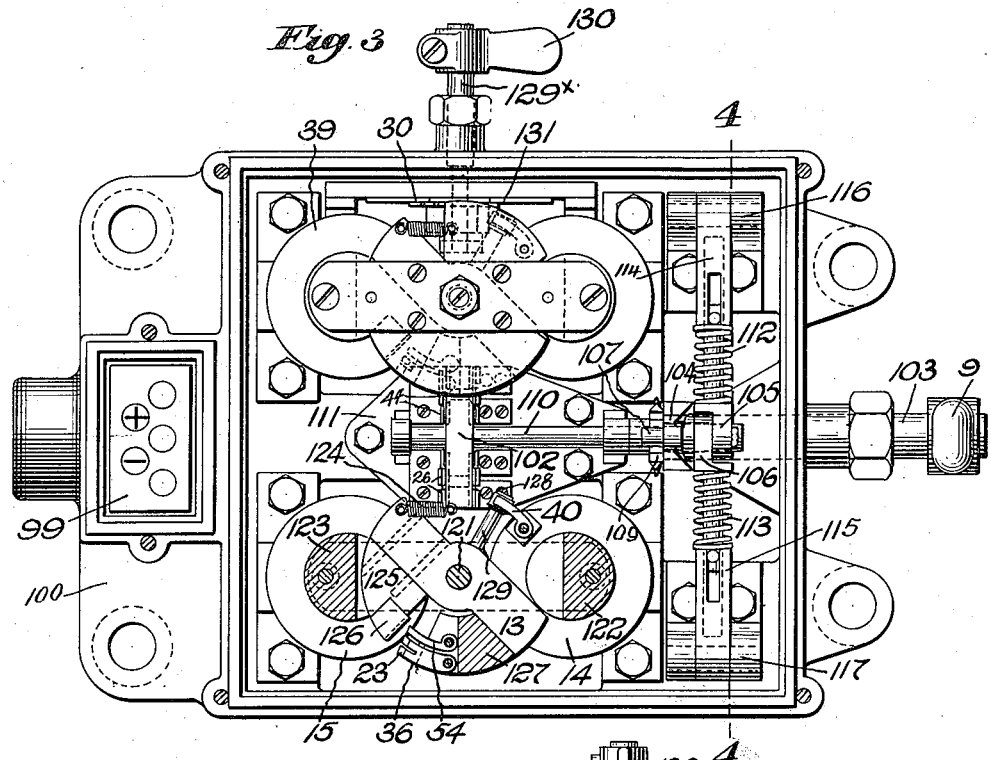

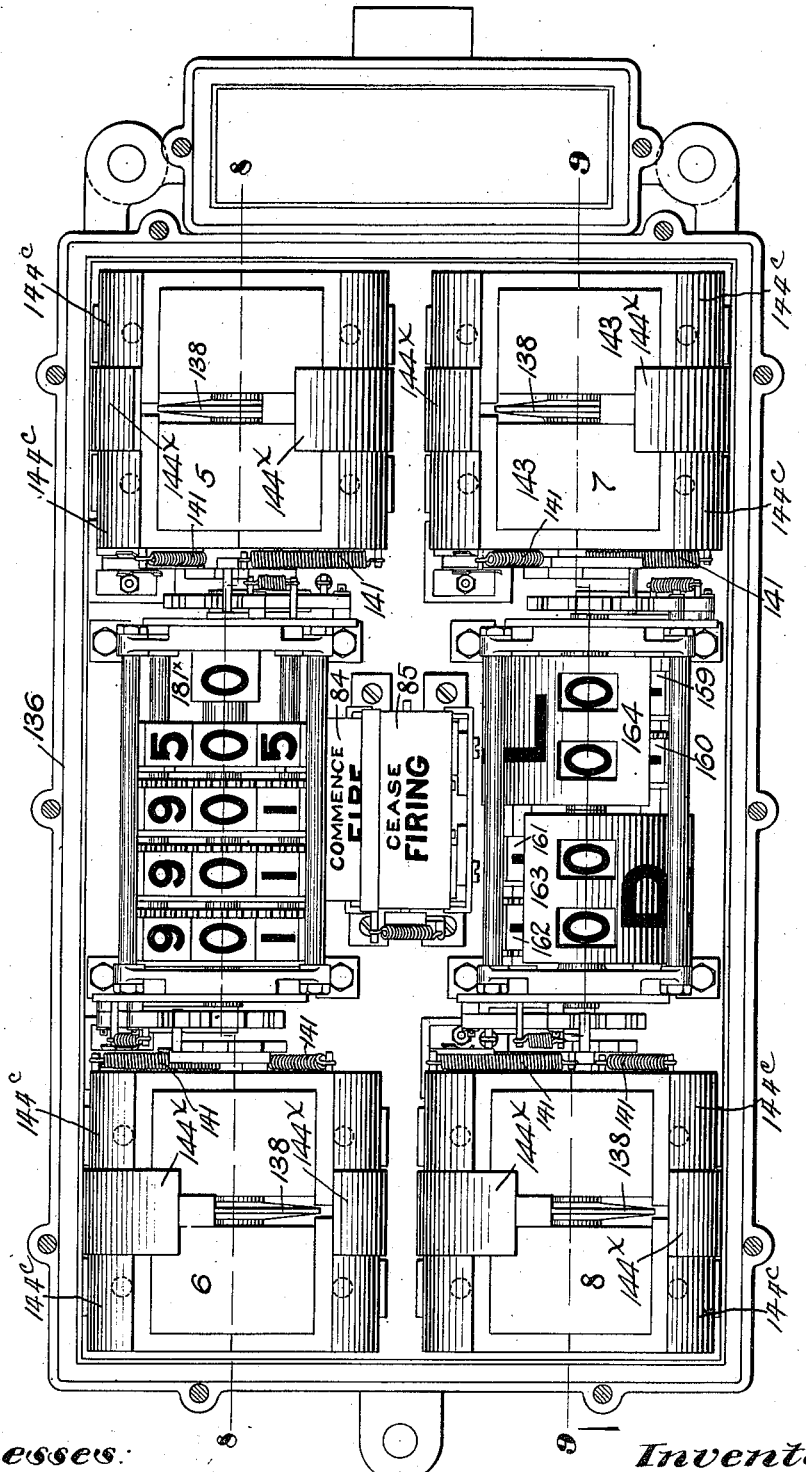

1,150,829.

Patented Aug. 17, 1915.
7 SHEETS—SHEET 5.

Witnesses:
Edwin T. Luce
Horace A. Crossman

Inventors:
Henry C. Wilson
Charles R. B. Claflin
by Emery & Booth Attys

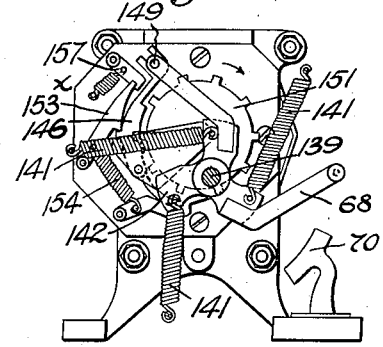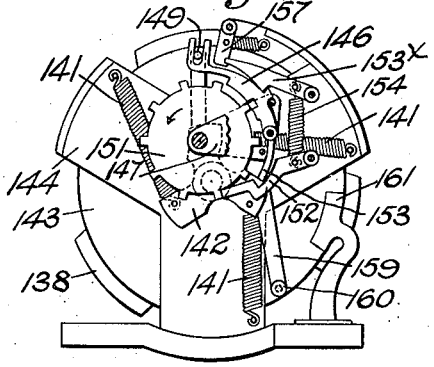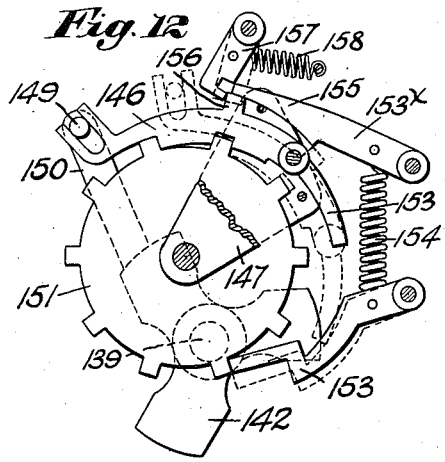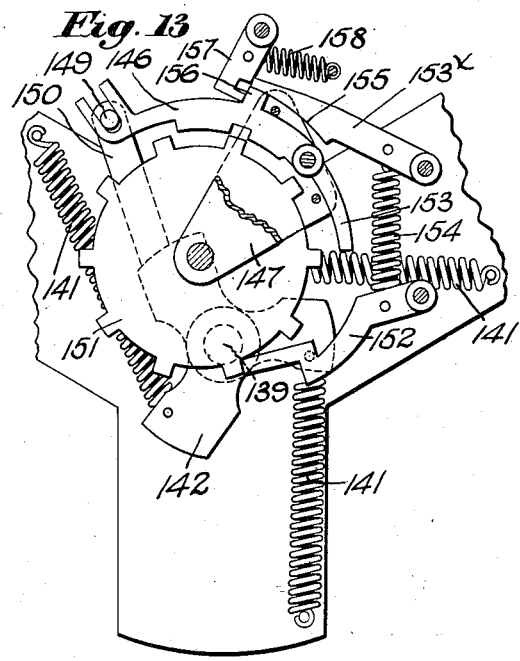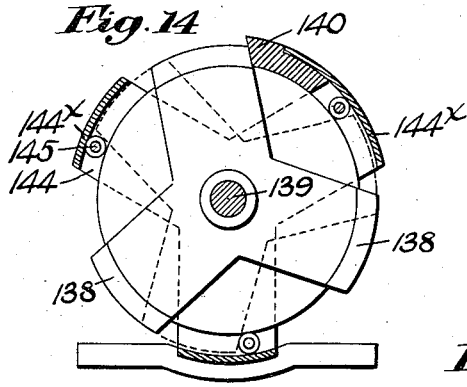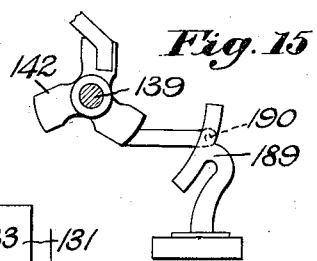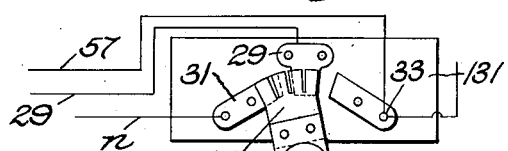

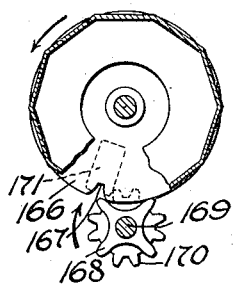
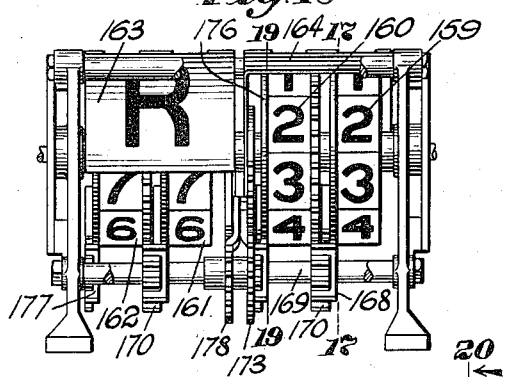
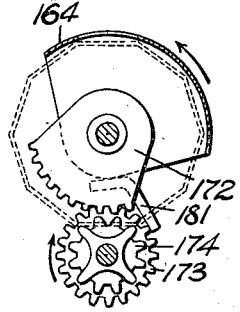
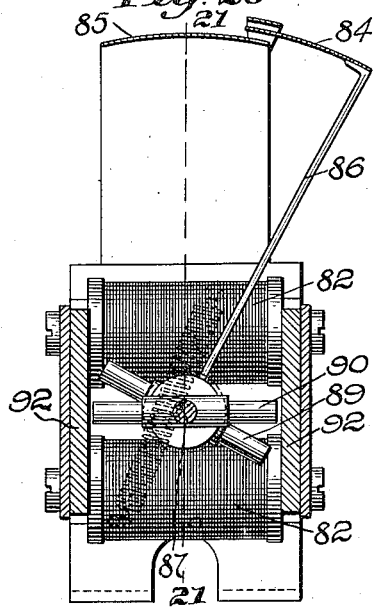
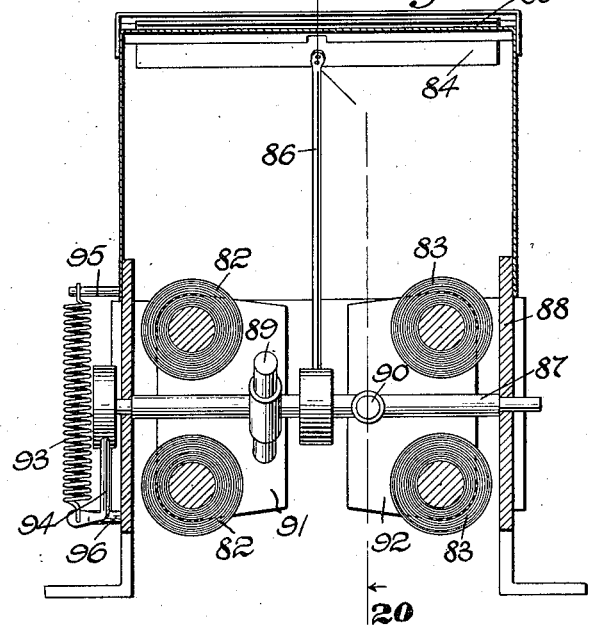
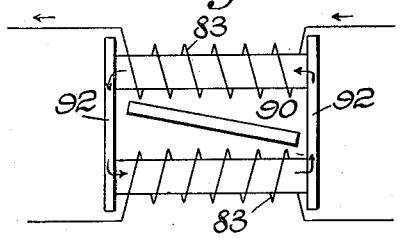
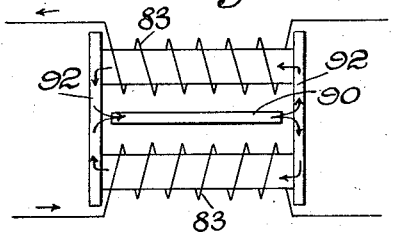

UNITED STATES PATENT OFFICE.

HENRY C. WILSON, OF NEW YORK, N. Y., AND CHARLES R. B. CLAFLIN, OF BOSTON, MASSACHUSETTS, ASSIGNORS, BY MESNE ASSIGNMENTS, TO ATLANTIC NATIONAL BANK, OF PROVIDENCE, RHODE ISLAND, A CORPORATION OF RHODE ISLAND.

SIGNALING SYSTEM.

1,150,829.  Specification of Letters Patent.  Patented Aug. 17, 1915.

Application filed August 27, 1907. Serial No. 390,290.

*To all whom it may concern:*

Be it known that we, HENRY C. WILSON and CHARLES R. B. CLAFLIN, both citizens of the United States, and residents, respectively, of the city, county, and State of New York, and Boston, county of Suffolk, and State of Massachusetts, have invented an Improvement in Signaling Systems, of which the following description, in connection with the accompanying drawings, is a specification, like letters on the drawings representing like parts.

This invention relates to signaling systems, its object being primarily to provide a system which will insure accuracy in signaling and obviate errors due to accident or inadvertence.

A further object is also to provide apparatus and a relative arrangement of apparatus which is mechanically and electrically simple and efficient.

This invention may have broad application to uses widely different from the specific one to which the same is herein illustrated as applied, but the invention is here shown as applied to a system of signaling where there are to be transmitted from a central station to one or more gun stations instructions relative to the range or other conditions, with reference to which the gunners should be informed.

While certain advantages resulting from this application of the invention are herein referred to, it is to be understood that this application of the invention is illustrative only.

The invention will be best understood by reference to the following description when taken in connection with the accompanying drawings showing for illustrative purposes one specific embodiment thereof, while its scope will be more particularly pointed out in the appended claims.

Figure 8:
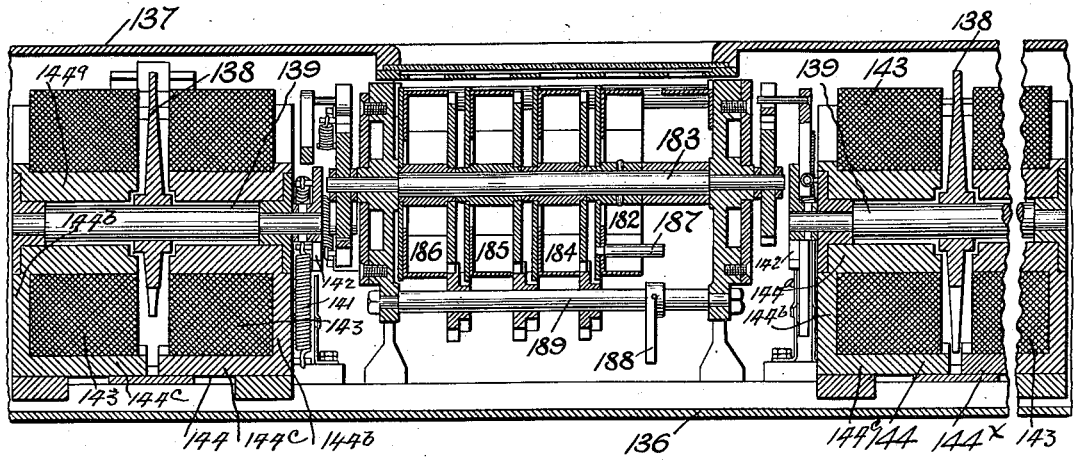
Figure 9:
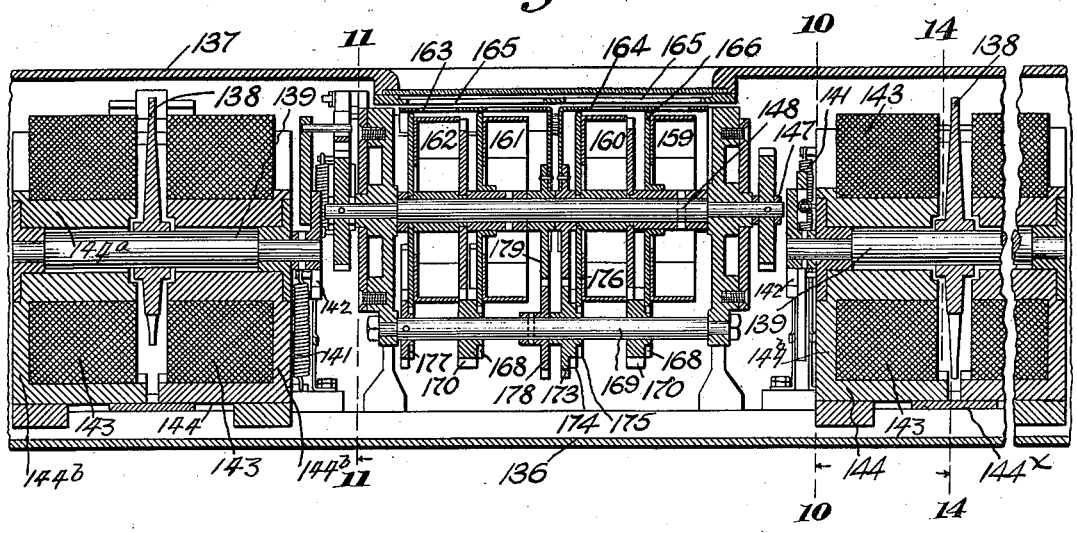

In the drawings: Figure 1 is a diagrammatic view showing the electrical connections between the members of one set of signaling instruments constructed in accordance with one form of this invention; Fig. 2 is another diagrammatic view illustrating connections which may be employed in the grouping of sets of instruments; Fig. 3 is a plan with certain parts in section showing one form of transmitting instrument which may be employed, the cover or casing thereof being removed; Fig. 4 is an end elevation of the same instrument partially in section taken on the line 4—4 in Fig. 3; Fig. 5 is a detail in perspective showing the relay switch-controlled contacts; Fig. 6 is a detail in perspective showing the hand-switch-controlled contacts; Fig. 7 is a plan view of one form of receiving or indicating instrument with the cover or top casing removed; Fig. 8 is a sectional elevation taken on line 8—8 in Fig. 7 and showing the construction of the range receiver parts; Fig. 9 is a similar section on line 9—9 in Fig. 7, showing the construction of the deflection receiver parts; Fig. 10 is a section taken on the line 10—10 in Fig. 9 looking in the direction of the arrow and showing the ratchet actuating mechanism for one end of the deflection receiver; Fig. 11 is a similar section taken on the line 11—11 in Fig. 9 and in the direction of the arrow, showing the ratchet actuating mechanism for the opposite end of the deflection receiver; Fig. 12 shows on an enlarged scale the ratchet mechanism of Fig. 11 at the end of its actuating movement; Fig. 13 shows the same mechanism at the beginning of its return movement; Fig. 14 is a section taken on the line 14—14 (Fig. 9) showing the construction of the motive devices; Fig. 15 is a detail showing the construction and the normal position of the controlled contacts for the deflection receiver; Fig. 16 shows in side elevation the auxiliary hand switch for the transmitter; Fig. 17 is a sectional view of the range-receiver indicating mechanism taken on the line 17—17 in Fig. 18; Fig. 18 is a front elevation of the same indicating mechanism; Fig. 19 is a section of the same taken on the line 19—19 in Fig. 18; Fig. 20 is a section on the line 20—20 in Fig. 21, showing the battle order indicator; Fig. 21 is a section on the line 21—21 in Fig. 20 also showing the battle order indicator; Fig.

22 is a diagrammatic view showing the connections of the battle order indicator coils; and Fig. 23 is a similar view.

Referring to the drawings and to the embodiment of the invention which is there shown, a more ready understanding of the same and an easier comprehension of its objects and the constructional details involved will be obtained by referring first to the general diagrammatic arrangement illustrated in Fig. 1, wherein the principal apparatus and working parts, while illustrated in detail upon the other sheets of drawings and described more fully hereinafter in the specification, are represented conventionally only.

Referring to Fig. 1, for the sake of illustration, there is represented a gun station denoted by G. There may be any desired number of such stations, but in Fig. 1 the arrangement of only one is shown, the construction of other stations, such as are diagrammatically represented in Fig. 2, being substantially the same. The devices at each station comprehend a range receiver, denoted generally by X, a deflection receiver, denoted generally by Y, and a battle order indicator, denoted generally by B. These signaling or receiving devices, of which but one set only need be described in detail, are connected by appropriate circuits with the central transmitting station A. As will be more fully explained, several transmitting stations may be employed, so that, by appropriately altering the circuit connections, signals may be sent to all of the gun stations from one central station, or to some gun stations from one central station and to others from another.

Although any number of central stations may be employed, for the purpose of this description, attention may be confined to the one central transmitting station A, shown in Fig. 1, it being understood that the construction and details of the other transmitting stations, if employed, may be or are the same as those described, their employment necessitating only alterations in the connections between the several transmitting stations and the respective gun stations.

Each central transmitting station is provided with a deflection transmitting apparatus 1 and a range transmitting apparatus 2 for transmitting through the connecting circuits signals respectively to the deflection receiver Y and the range receiver X at the gun station. Also at the central transmitting station, in order, for purposes to be described, to repeat thereat the transmitted signal when the same shall have been made at the receiving end, there are preferably employed a deflection repeater 3 and a range repeater 4. The said deflection transmitter and range transmitter, and deflection repeater and range repeater constitute a set of instruments furnished at the transmitting station, and the range receiver and deflection receiver constitute a coöperating set of instruments located at the relatively distant receiving station, the separation of the two stations being indicated by the break in the connections.

In order to notify the gunner at the gun station of an increase or decrease in the range, the range receiver is provided with an indicator for indicating the range in suitable increments, which increments may be in units of any size or scale, such, for example, as increments of fifty yards. The indicator may be made to advance or increase by one increment on the actuation of the motive device 5, and to decrease by one decrement on the actuation of the motive device 6 at the range receiver.

In the illustrated form of this invention, on the closing of a circuit at the range transmitter, the motive device 5 will be caused to turn in the direction of the arrow raising the range indication, while, on the closing of another circuit at the range transmitter, the motive device 6 will be caused to swing in the opposite direction, as represented by the arrow, lowering the range indication. The details of the indicator will be explained more fully later on. In a like manner the deflection receiver is provided with an indicator for indicating the amount of the deflection in suitable increments, herein arbitrary increments of degrees or points, and such deflection is similarly represented by increments to the right or increments to the left, which are indicated by actuation of the motive devices 7 and 8, respectively, through the closure of suitable circuits at the deflection transmitter 1. The mechanical details of the deflection receiver will be more fully described later.

Referring now to the apparatus at the transmitting station, its purpose is to place the intermittent actuation of the motive devices at the receiving station within the control of the attendant or attendants at the transmitting station, thereby to cause an incremental change in the range or deflection indication at the gun station and at the will of the attendant. In the present embodiment of the invention this is accomplished by providing a deflection transmitting apparatus 1 and a range transmitting apparatus 2, the one substantially a duplication of the other except for position or location. Each is provided with a hand switch 9 which may be thrown to one side or the other of its normally central position, and effect thereby a closure of one or another of two circuits, the latter controlling, respectively, the motive devices at the receiver which cause the change of indication in one direction or the other. That is to say, the deflection transmitter 1 is provided with a switch 9 normally upright, but which may be moved to the right to actuate the motive device 7 at the receiving station and increase the indicated right-hand lateral deflection, while decreasing the indicated left-hand lateral deflection. Or the switch may be thrown to the left to actuate the motive device 8 and increase the indicated left-hand lateral deflection, while decreasing the indicated right-hand lateral deflection. Likewise the range transmitter 2 is provided with a similar switch 9, but preferably normally in horizontal position, a downward movement of the said switch serving to actuate the motive device 6 at the range receiver and give a downward movement to the indicator and an upward movement of the switch serving to actuate the motive device 5 at the range receiver and give an upward movement to the indicator.

Referring first to the deflection transmitter, the same is connected with the motive devices 7 and 8, respectively, by means of circuits $r$ and $l$, which lead from the terminals R and L, respectively, at the deflection transmitter to correspondingly lettered terminals R and L at the deflection receiver. The deflection transmitter is also provided with terminals P and N connected to the positive and negative supply mains, the latter represented by the heavy lines near the center of the diagram. The precise connections are, of course, immaterial, but in the present instance the terminal N is shown as connected directly to the negative main $n$, while the connection of the terminal P to the positive main $p$ lies through the intermediate switch 10, which may be employed to connect the transmitting instruments to the positive main or disconnect the same therefrom.

In order to make the transmitter more effective, as will more fully appear, the hand switch 9, instead of acting directly to close the transmitting circuits, acts to control the secondary or relay switch 11 or 12, as the case may be, thereby closing the circuit $r$ or the circuit $l$ to actuate the appropriate motive device at the receiver. The switches 11 and 12 and their controlling magnets and controlled contacts are of substantially similar construction and arrangement. Referring to the switch 11, for example, it is secured to the pivoted armature 13 normally held by a spring offset at an angle between the poles of the magnets 14 and 15, which latter act to control the said switch, and, when energized, to swing the same into the position shown by dotted lines where the armature assumes the direction of the lines of force between the magnets and the switch 11 lies at right-angles thereto. The control of the transmitting circuit $r$ is effected by the movement of the controlling switch 11, which carries at one end the contact piece 16 and at the opposite end the contact piece 17.

Referring now to the circuits controlled primarily by the hand switch 9 for the purpose of closing the transmitting circuit $r$, the positive terminal P of the instrument is connected to the controlling magnets for the relay switch 11 by a circuit which is kept normally closed by the other relay switch 12. The terminal P is connected by the conductor 18 to the stationary contact 19, which latter is normally kept in electrical communication with the adjacent stationary contact 20 by means of the movable bridging contact 21, carried by the relay switch 12. From the contact 20 the positive circuit then passes through the wire 22 to the stationary contact 23, which is controlled by the movable contact 16 on the controlling switch 11 and thence to the contact 24 at the hand-switch 9.

If the movement of the hand switch 9 is to the right the contact piece 24 is placed in electrical communication with the adjacent contacts 25 and 26. The contact 26 is connected through the wire $55^x$ with the magnet coil 14 for the switch 11, the said coil 14 acting as the actuating or moving coil of the magnet. The other terminal of the said coil is connected through the wire 56 with the negative main, such connection, however, being had through the deflection repeater as follows. From the coil 14 the wire 56 passes to the contact 33 and the circuit then leads through the wire 57 to the terminal 58 of the transmitter and thence through the wire 59 to the corresponding terminal 58 of the deflection repeater. At the repeater the said terminal 58 is connected by the wire 60 with the fixed adjacent contact 62 by the movable bridging switch arm 63 carried by and movable with the motive device 50. The contact 62 is connected with a similar contact 64 and the latter is normally connected with the contact 65 by means of the switch arm 66 on the motive device 49, the contact 65 being connected by wire 67 with the terminal N of the instrument, which latter has connection directly to the negative main. With the connections described, therefore, the actuating coil 14 is connected between the positive and negative mains just as soon as the switch 9 is thrown to the right.

Simultaneously with the energization of the coil 14 through movement of the hand switch 9 the coil 15 is also energized. When the switch is moved as described, current passes from the contact 24 to contact 26 and thence through the wire 27 to the coil 15. The other terminal of the coil is connected with the negative terminal N of the deflection transmitter through the wire 28, the stationary contact 29, the bridging switch 30, the stationary contact 31 and the wire 32. The switch 30, however, is adapted to place the contact 29 in communication with the stationary contact 33 instead of the contact 31 when moved to the dotted line position shown.

The energization of the coil 14 throws the relay switch into the dotted line position indicated and brings the movable contact 16 into connection with the positive contact 23. The transmitter terminal R of the instrument is connected directly by means of the wire 35 with the contact 36 at the side of the contact 23, so that the moment this movement of the switch occurs, the terminal R, and therefore the motive device 7 at the deflection receiver, is connected to the positive side of the line.

At the deflection receiver the actuating coils of the motive devices 7 and 8 are permanently connected to the negative main through the wires 37, the battle order indicator B, the wire 38 and the instrument terminal N, so that the moment the relay switch 11 executes the movement described, the coils of the distant indicating device are excited and the indicator shows an advance of one step to the right.

The simple signal which is manifested at the receiving end by an increment or decrement in the indicated amount of the range or deflection, may be transmitted in the described fashion from either the range transmitter or the deflection transmitter, and either up or down, or to the right or left, the circuit connections within the instruments themselves being substantially the same with each one of the four sets of relay switches utilized in the two instruments. If the hand switch 9 is thrown to the left the actuating coil 39 for the left-hand transmitting switch is excited by means of a circuit as follows: from the positive terminal P through the wire 18× to the contacts 40 and 41, wire 42 to the contact 43, thence through contact 45 to the coil 39 and thence to the contact 33 and through the wire 57 to the terminal 58 of the instrument. From this terminal the current is carried to the negative main in a similar manner, as is described with reference to the actuating coil 14. Left hand movement of the hand switch also energizes the holding coil 39×, the current passing from the hand switch contact 43 to contact 44, thence to the coil 39× and the contact 29, whence it leads to the negative terminal of the transmitter through the bridging switch 30 and wire 32.

The consequent movement of the switch 12 connects the positive contact 46 with the contact 47, the latter leading directly to the terminal L of the instrument, thus placing the distant motive device 8 in connection with the line and showing an advance at the indicator of one step to the left.

In order to have it certain that the signal has been actually displayed at the receiving station, means are provided, dependent upon the manifestation of the signal at the receiver, for repeating the same back to the transmitting station, and means are also provided whereby, until the repetition of such signal takes place, the relay switch will remain automatically closed and the transmitting circuit cannot be either accidentally or intentionally broken.

To provide for repetition of the signal, the repeaters 3 and 4 are constructed substantially the same as the receivers X and Y. That is to say, similarly arranged indicating devices are provided and similar motive devices 49, 50, 51 and 52. Inasmuch as the deflection transmitter and range transmitter will ordinarily be operated by two different persons who may be called upon to observe individually and independently the indication of the repeater, the deflection repeater and range repeater are preferably separate instruments, positioned adjacent their respective transmitting instruments, while the range receiver and deflection receiver may be and preferably are embodied in the same instrument. Otherwise, save for the arrangement of contents to be described, the construction of the repeating instrument may be identical with that of the receiving instrument.

Referring now to the deflection transmitter, when the switch 9 is thrown to the right and the switch 11 is moved to connect the transmitting circuit r to the positive main, the moving switch contact 16 also connects the contact 23 to a third stationary contact 54. The latter is connected by the wire 55 to the hand switch contact 26 and also to one terminal of the actuating coil 14. It therefore follows that, so long as the repeating instruments are undisturbed and remain in their normal condition, as shown, the switch arms 63 and 66 maintain uninterrupted the connection between the negative main and the stationary contact 54 at the relay switch 11. When, therefore, the relay switch is moved to its active position shown in dotted lines, the current passes from the contact 23 to the contact 54 and thence through the wire 55 to the actuating coil 14 and thence through the repeating instrument to the negative main, as described. It therefore also follows that, until the circuit is broken at the repeating instrument the actuating coil 14 remains energized and continues to hold the relay switch in its operative position irrespective of the movement of the hand switch 9 and irrespective of whether the excitation of the holding coil 15 is continued or not. The circuit at the repeater, however, is not broken until the indication has been made at the receiver. To effect this, each motive device at the receiver is provided with a switch arm substantially similar to those described in connection with the repeaters, differing, however, in the fact that the switch arms at the repeater maintain their controlled circuits normally closed, while those at the receiver maintain them normally open.

Referring to the motive device 7 at the receiver, its switch arm 68 normally holds open the repeating circuit at the contacts 69 and 70. The latter is connected directly to the negative main through the wire 38, while the former is connected to the terminal 71 of the receiving instrument, which terminal is connected by the wire 72 with the corresponding terminal 71 at the deflection repeater. The terminal 71 at the deflection repeater is connected by the circuit 73 with the exciting coils of the motive device 50. When the motive device 7 at the receiver is energized, it swings the switch arm 68 to the right at the same time it actuates the indicator. This serves to bridge the contacts 69 and 70 and to excite the coils of the motive device 50, the latter being connected directly to the positive terminal P of the deflection repeater, which, in turn, is connected to the positive main. This causes the motive device to actuate its indicating mechanism and repeat the signal at the same time to open the relay-switch-controlling circuit at the contacts 61 and 62. If the hand switch 9 has been withdrawn from the contacts 24, 25, 26, this rupture of the switch-controlling circuit at the repeater immediately deënergizes the actuating coil 14 and the holding coil 15 being deënergized by withdrawal of the hand switch, the relay switch 11 is retracted to its normal inactive position. If the hand switch 9 has not been withdrawn from the said contacts, the holding coil 15 will remain energized until the hand switch is withdrawn.

As soon as the relay switch opens, the motive device 7 at the receiver is deënergized and the switch arm 68 falls back breaking the repeater circuit. As soon as the repeater circuit is broken the switch arm 63 at the repeater falls back again, bridging the contacts 61 and 62 and again closing the switch-controlling circuit, but until the entire cycle of operations has been completed,—that is to say, the transmitting circuit closed, the motive device 7 actuated, the indication effected, the repeating circuit closed, the repeater actuated, and the switch-controlling circuit for the holding magnet opened,—the relay switch at the transmitter is automatically held closed irrespective of the movements of the hand switch, thereby insuring the transmission of a signal when once attempted.

From the diagram it will be apparent how the relay switch 12 may be moved to close the transmitting circuit 1, thereby actuating the motive device 8 and in turn the repeating device 49. The repeating circuit for left-hand deflections is represented at 74, connecting the terminals 75 at the receiver and repeater. It will be readily understood that the left-hand movement of the hand switch 9 effects an increase in the left-hand range deflections through the circuits mentioned, in precisely the same fashion as the right-hand movement of said switch effects increments in the right-hand deflection indication, which has been fully set forth and further explanation will be unnecessary. Without further explanation also the mode of operation of the range transmitter 2 for both up and down transmissions will be readily understood, the connections between the range transmitter 2, range receiver X and range repeater 4 being of a similar nature to the connections between the deflection transmitter 1, deflection receiver Y and deflection repeater 3. The transmitting circuit for increments or up indications is designated by $u$, connecting the terminals U at the transmitter and receiver. The transmitting circuit for the decrements or down indications is designated by $d$, connecting the terminals D at the transmitter and receiver. The repeating circuit for up deflections is designated by 76, connecting the terminals 77 at the receiver and repeater, and for down deflections is designated by 78, connecting the terminals 79. The circuit connecting the range repeater with the range transmitter, and which serves to automatically control the relay switch, is designated by 80 and connects terminals 81 at the range transmitter and range repeater. The indications of range are produced at the receiver and repeated back to the repeater in precisely the same manner, so far as electrical connections are concerned, as are the indications for deflection, the hand switch for the range transmitter, however, being preferably positioned normally in a horizontal plane, so that the operator will unconsciously raise it for an increase in range indication and lower it for a decrease.

It may frequently happen that for synchronizing or other purposes a rapid change of indication over a considerable range may be desired, in effecting which the incessant reciprocatory movement of the hand switch 9 may be tedious or tiresome. In order to provide for a continued or uninterrupted raising or lowering of the indication by means of a single movement of the hand switch 9, the auxiliary switch 30, already referred to, is provided.

It will be observed that in transmitting signals as above described the holding coil 15, having one side connected directly to the negative main, will remain energized so long as the hand switch is held in operative position. The actuating coil 14, however, is deënergized as soon as the repeater acts to break the switch-controlling circuit, but, unless the hand switch is retracted, the holding coil 15 will continue to hold the relay switch in its operative position.

The switch 30 is designed to place the holding coil 15 also under the control of the repeater, so that, when the repeater moves and breaks the switch controlling circuit, it will deënergize both coils and allow the switch 11, to open, even though the hand switch 9 is held in operative position. This is effected by moving the switch 30 to the position shown in dotted lines whereupon, with the connection broken at the contact 31, the negative terminals of the holding coils 15 and $39^x$ are both placed in connection with contact 33 and therefore indirectly with the negative main through the repeater, instead of being connected directly therewith through terminal N, as is the case in the full line position of the switch.

When the auxiliary switch is moved, as described, and the hand switch held in operative position, for example, to the right, indication will be caused at the receiver and at the repeater, as previously described. When the repeater, however, breaks the switch-controlling circuit it will deënergize both the actuating and the holding coils and allow the relay switch to open. As soon as the relay switch opens, the switch arm 68 at the receiver moves to break the repeater circuit, and the switch 63 at the repeater then moves again to close the relay-switch-controlling circuit 59, and the relay switch is again closed. In other words, in the cycle of operations under the conditions described, the closing of the relay switch causes the repeater to open the relay-switch-controlling circuit. This opens the relay switch and causes the repeater again to return to its normal position, and this, in turn, again closes the relay switch. This provides for a repetition in the cycle of operations without interruption so long as the hand switch 9 is held closed and causes the sending of a succession of like signals following each other one after another as rapidly as the mechanical movements of the successive circuit-controlling devices can follow each other.

Although the holding coil 15 may be separate from the actuating coil 14, as will be hereafter seen, they are preferably arranged to have the same magnetic circuit. The holding coil is preferably weaker than the actuating coil, that is, in the number of ampere turns. This provides for a more rapid transmission by making the relay switch more sensitive.

With the holding coil of equal strength with the actuating coil its magnetism tends to fall away so slowly that a quick movement of the hand switch back to its closed position after having been thrown open might reënergize the coils before the relay switch had time to release. The principal function of the holding coil 15 being to hold the relay switch in position, and the actuating coil 14 to move it into position, the former does not require the strength of the latter for best conditions of sensitiveness. It will be seen that the holding coil is kept energized so long as the hand switch is held over and the resultant indication is therefore held fixed. The indications therefore must follow the movements of the hand switch provided, however, that sufficient time must elapse between beats of the hand switch for the repeater to break the current of the actuating coil.

It will be observed that the positive terminal P at the transmitter is connected to the controller coils for each relay switch through contacts which are broken on the initial movement of the other relay switch. Thus, the positive lead for the actuating coil 14 of the switch 11 first passes through the contacts 19 and 20 controlled by the relay switch 12 before passing to the hand switch contacts 24 and 25 and the coil 14, so that, as soon as the relay switch moves, and until it is restored again to its open position, neither coils 14 or 15 can be energized. In a like manner the positive lead for the coils controlling the switch 12 first passes through the contacts 40 and 41 controlled by the switch 11, so that, as soon as the latter moves, the movement of the switch 12 cannot take place until the switch 11 returns to its open or inoperative position. This feature of the apparatus makes it impossible to send a signal of one class while signals of the opposite class are being sent, the transmitter being rendered inoperative for sending signals of but one class at a time, and incapable of being affected in any way by movement of the hand switch 9 until the signal sent has been displayed and repeated back.

Any desired form of auxiliary signaling apparatus, and for sending any desired kind of signals, may be used in connection with the receiving stations described, or any of them, such, for example, as the battle order indicator referred to. This may be of any suitable or desired construction, but in the drawings there is shown a type which may be used with advantage coöperatively with the instruments described.

Referring both to the diagrammatic representation of the battle order indicator in Fig. 1, and to the illustration of its construction shown in Figs. 20 to 23, there are provided two pairs of coils 82 and 83, one pair of which is energized to display one kind of signal and the other to show another kind.

In the present case there are provided merely two signals "Commence fire" and "Cease firing," which instructions are printed respectively on a shutter 84 (Figs. 20 and 21) and on the plate 85 immediately below the plane of the shutter. The shutter is capable of limited angular movement so that in one position (see Fig. 7) the plate displays the "Cease firing," but in the other position is covered by the shutter which displays the instructions "Commence fire." Through the cover or casing of the instrument the shutter instructions are invisible in its back position.

The shutter 84 (see Fig. 20) is carried by the arm 86, secured to the rock shaft 87, the latter journaled in the frame 88 and carrying the two preferably soft iron armatures 89 and 90. The latter are displaced relatively at a slight angle, but have their ends closely adjacent the pole pieces 91 and 92 respectively of the magnet coils 82 and 83.

By reference to the wiring diagram it will be seen that each battle order coil is in circuit with one of the four motive devices at the receiver, and that one member of a pair (82 and 83) is in series with one motive device of the deflection or range receiver, while the other member is in series with the other motive device of the same receiving element. For example, every time the circuit $r$ is closed to actuate the motive device 7, the current also passes through one of the coils 83, and when the circuit $l$ is closed, the current passes through the other of the two coils 83, as well as the motive device 8.

In either case where one coil only is energized the size of the pole pieces 92 is such that substantially all the magnetism is kept within the limits of the magnet cores and the pole pieces, as represented by the arrows in the diagram Fig. 22, and no effect is produced upon the armature 90. On the other hand, the winding of the two coils is such that if both are energized at the same time,— that is by current passing through both transmitting circuits $l$ and $r$,—opposed magnetism is produced in the two coils, which is forced through the intermediate armature 90, as represented by the arrows in Fig. 23, thereby drawing the armature into a horizontal position, as shown. This throws the shutter back into the position shown in Fig. 20 and displays the signal "Cease firing". In a similar manner if both of the coils 82 should be simultaneously excited, the armature 89 would be thrown to a horizontal position and the shutter 84 thrown forward over the plate 85 to display its signal "Commence fire".

The shutter is provided with means which act, when it is thrown to one position or the other by one pair of actuating coils, to hold it in that position until its position is reversed by excitation of the other set of actuating coils. Any suitable means may be provided for this purpose, but in the disclosed embodiment of the invention the spring 93 has one end connected to an arm 94 upon the rock shaft 87, and its other end fixed to a pin 95 upon the frame 88,—the points of adjustment being such that (see Fig. 20) the spring is thrown from one side to the other of the axis of the rock shaft, thereby exerting a slight tendency to hold it fixed in either of its extreme positions. Stop pins 96 are provided which limit the movement of the pin 94, and, therefore, the movement of the rock shaft 87, in each direction.

In order simultaneously to excite both members of either set of coils 82 or 83, auxiliary means are provided at the transmitter for simultaneously closing both transmitting circuits $r$ and $l$ on the one hand, or $d$ and $u$ on the other.

Referring to Fig. 1 and the coils 83, which are used to display the signal "Cease firing", a special short-circuiting switch 97 at the deflection transmitter is used, which switch, when moved to the dotted line position shown, connects three wires leading directly to the circuits $r$ and $l$ and the positive main $p$. When this switch is closed current passes simultaneously through both of the coils 83.

In conjunction with the range transmitter a similar auxiliary circuit-closing switch 98 is employed, which connects the circuits $u$ and $d$ to the positive main and simultaneously passes current through the coils 82 to display the signal "Commence fire". When either set of coils 82 or 83 is energized in the fashion described both of the connected motive devices 5 and 6 or 7 and 8, as the case may be, are also energized, but, as will be seen from the description to follow of the actuating or ratchet mechanism, this merely serves to lock the two motive devices of either set and their indicator against movement. It therefore follows that when current is passed through both coils 83 to send a battle order signal no change in indication of the deflection can be transmitted, and when current is passed through both coils 82 no change in indication of the range can take place.

To make it certain that no disturbance of the indicator can take place through manipulation of the hand switch while the battle order is being used, the switch 97 is so connected that, when it moves to display the battle order signal, it acts to interrupt the positive connection to the terminal P. On the other hand, when the switch is connected to the positive main, the battle order coils 83 cannot be simultaneously energized.

It will be observed that through the circuit arrangement described, no additional transmitting wires are necessary, but that the signal is operated by the simultaneous closing of two circuits, which are ordinarily separately closed for the transmission of different classes of signals.

Any number of receiving stations may be connected to be operated from the same transmitting station, and when so connected the arrangement may be such that the transmitting switch will be automatically held to its closed position until the last receiver to operate repeats the signal back to its repeater. In Fig. 2 there is shown for illustrative purposes a grouping of three receiver stations which may be supposed to be located at separate gun stations, each having its own repeater at the transmitting end. There are also shown two sets of transmitting instruments, from either of which signals may be transmitted to the gun stations. The reference numerals employed in Fig. 2 correspond generally to those in Fig. 1, so that circuit connections may be readily followed out from the description of Fig. 1. It will be obvious that while only three gun stations and two transmitting stations are shown any number of these may be employed, and circuit connections may be used to give any desired arrangement or grouping of the instruments.

Each of the gun stations G, G' and $G^2$, etc., is provided with a range receiver X, a deflection receiver Y, and a battle order indicator B, and each is serially connected to the respective repeater 3, 4, 3', 4' or $3^2$, $4^2$, by the repeater circuits 72, 74, 76 and 78. The repeaters are connected in multiple to the switch controlling circuits 80 and 59, which are connected to the several transmitters, either directly, as shown, or through appropriate switches. The transmitting circuits $r$, $l$, $d$ and $u$ lead from the transmitters to the receivers in multiple. It therefore follows that when the signal is sent from the transmitter A, as, for example, an increment in the range, the signal is displayed at each of the range receivers connected in multiple, but is repeated back by them individually to their respective repeaters. Inasmuch, however, as the relay switch-controlling circuits leading from the separate repeaters back to the transmitter are connected in multiple, the switch-controlling circuit will not be broken and the relay switch at the transmitter released until the last repeater of the series has moved and shown the increment of range, which, of course, cannot happen until every receiver in the series has acted. The series arrangement of the repeaters relatively to the receivers and their multiple arrangement relative to the switch controlling circuits effectively provides against the transmission of a second signal until every one of the receiving instruments, however many, has responded.

It may happen that transmission of signals may be desired from another transmitting station, such, for example, as that represented at A', and this may be accomplished by switches for switching the circuits from the one to the other. As conventionally illustrative of such a switch, there is shown the circuit-changing switch S adapted to connect the positive main to the positive terminals of either of the instruments A or A'. If the station A' is apart from the station A an additional set of repeating instruments may be located at the station A', connected each to its respective gun station, as are the repeating instruments shown, but in Fig. 2, for sake of simplicity, one set of repeating instruments only is shown. It may also be desirable at times to group the gun stations so that one set of stations, representing, for example, the guns of a battery, may be directed from one transmitting station and another set from another station. To provide for this, suitable switching devices may be employed, so that any desired group of gun stations may be connected to transmitter A and another to the transmitter A'. As illustrative merely of such connections, there is here shown the double-throw switch S', which, in the full line position shown, connects the transmitting circuits of the gun station $G^2$ to the transmitting circuits leading from the other stations to the station A. If the switch is thrown to the dotted line position shown, connections between the station $G^2$ and the station A is interrupted, and the former is connected to the transmitting circuits leading from the station A' and the station $G^2$ then falls under the direction of the station A', while the stations G and G' remain under the direction of the station A. Under such circumstances the station A' will have its own repeating instruments (not shown) corresponding to the gun station $G^2$ and such other stations as may be grouped with it, and also have separate connection (not shown) to the positive main.

For sake of simplicity the battle order switches are not shown in Fig. 2, but it will be obvious that the battle order indicators at all stations will simultaneously display the appropriate signal sent from the transmitting station in just the same manner as the single station in Fig. 1 is operated in that respect.

This invention when embodied in a range signaling system as specifically shown, may, of course, be applied to guns either on shipboard or on shore, the particular system here described, however, being especially designed to meet requirements on ship board.

Referring now to the construction of the instruments, it is to be understood that the invention is not limited to their particular detailed construction, and, that as a system, the instruments represent merely component elements thereof. Certain features, however, have especial merit and advantage, particularly when the invention is embodied in a system of the character described.

Figs. 3–6 and Fig. 16 show the arrangement of the working parts of the transmitters. The terminal wires are carried into the terminal box 99 at one end where they lead to the respective parts of the apparatus, which parts are mounted upon the base 100, the latter provided with the removable cover 101.

The hand switch 102 (Fig. 6) comprises a contact-carrying disk of insulating material mounted near the center of the instrument and is turned by means of the handle 9 at the outside thereof. In order that no injury can result to the switch through rough usage, and in order also to provide for necessary movement of the switch 102 whenever the handle 9 is moved, as well as to prevent arcing at the switch, the latter is mounted very delicately so as to move easily, and to close the controlled circuits on slight movement, while the handle on the other hand is mounted to swing against considerable resistance, and also to have slight lost motion with reference to the switch, so when sufficient force is applied to it to move it at all, it picks up the switch 102 while under head-way and effects a very certain and positive movement of the latter, making it also difficult to leave the switch 102 in a half-closed position where it can arc.

Referring to Figs. 3, 4 and 6, the handle 9 is connected to the rock shaft 103, the latter being secured to an out-turned rock arm 104 within the casing. The arm 104 has pivotal connection on one side to the overlapping heads of the two plunger pins 105 and 106, while on the other side is provided with a pin 107 which has a limited range of play between the two branches of the forked rocker arm 109, which rocker arm is fixedly attached to the rock shaft 110 carrying the switch 102. Strong and solid journals are provided for the rock shaft 103 in the casing, and the switch rock shaft 110 is journaled in bearings upon the plate 111.

The switch arm is held normally in a mid-position by the heavy coil springs 112 and 113, which are connected between the heads of the plunger pins 105 and 106 and the ends of the pivoted guides 114 and 115 in which the opposite ends of the plunger pins have sliding movement. The guides are pivoted between heavy ears 116 and 117. It therefore follows that to move the switch handle in either direction, one or the other of the springs must be compressed. The springs being relatively heavy, the force required to accomplish this will cause movement of the handle quick enough and far enough to throw the switch 102, before such movement can be intentionally stopped.

The switch disk 102 carries contacts 118 which bridge the stationary spring contacts 24 and 25, or 43 and 45, as the case may be, and the bridging contacts 118 are also connected to contacts 119 on the opposite face of the disk, which places the contacts 24 and 25 in circuit with the double finger contact 26 fixed at the opposite side of the disk, or the contacts 43 and 45 in circuit with the double finger contact 44, (not shown but also at the opposite side of the disk.)

The controlling coils of the relay switch are shown as suitably supported upon the base 100. The bridging plate 120 of non-magnetic material is shown removed from the coils 14 and 15 in Fig. 3, to better illustrate the construction of the armature 13. The latter is pivotally mounted upon the shaft 121 and has its ends movable over the cut-away portions of the pole pieces 122 and 123. It is normally held in the position shown by the coil spring 124, which has one end attached to an inturned pin on the bridging plate. Secured to one side of the armature is a switch member 125, formed of a plate of insulating material and carrying the bridging contact piece 126. Stationarily secured to the bridging plate is a block 127 of insulating material suitably cut away (as represented in Figs. 3 and 4) to allow for the swinging movement of the armature and carrying the three contacts 23, 36 and 54 (see Fig. 5), which are adapted to be short-circuited by the bridging piece 126 when the armature swings around on the excitation of the coils. This acts to close the circuit through the actuating coil 14 and also closes the transmitting circuit r leading to the distant receiver.

In order that the actuating coil may be excited the instant the relay switch moves, so that, if the handle is quickly released, the signal will surely be displayed and repeated before the relay switch is released, the actuating coil contact 54 and the positive contact 23 are slightly longer than the transmitter circuit contact 36, so that the actuating coil is excited in advance of the closing of the transmitter circuit.

The contacts 40 and 41, to which the positive lead of the actuating coil for the other relay switch passes, are carried by the stationary block 127 of insulating material and are normally bridged by means of the cylindrical piece 128 of conductive material, the latter carried by, but insulated from, the lateral arm 129 secured to and movable with the armature. It will therefore be seen that, when the actuating coil 14 is excited the circuit is broken at the contacts 40 and 41 immediately on the movement of the switch and the other set of controlling coils cut out of circuit. The auxiliary hand switch 30 (visible near the top of Fig. 3) is shown in side elevation in Fig. 16. It is mounted on the rock shaft 129ˣ at the top of the casing and provided with a handle 130. Within the casing there are provided upon a suitable insulating base 131 (see Fig. 16) the contact 31 leading to the negative terminal, the contact 29, leading to the holding coil and the contact 33, all connected as represented in Fig. 1. The switch is normally held so as to bridge the contacts 31 and 29 by means of the spring 132 secured to the arm 133, which latter works between the stops 134 and 135. As previously stated, when the handle 130 is turned to bridge the contacts 29 and 33, the indicator will continue to work so long as the handle 9 is held thrown over in either direction.

As shown in Fig. 16 the bridging switch is preferably constructed so that the connection between the contacts 29 and 33 is established before connection between contacts 29 and 31 is broken, thereby leaving no interval during which the holding coil may be deprived of current.

While the purpose of the invention may be carried out with transmitting instruments of widely different construction and this invention is not limited to the details or form or arrangement of parts here described, the transmitter as disclosed and described has been found very effective in practice, both in electrical and mechanical construction, and particularly in its capacity to stand rough usage whether accidental or intentional, and its capacity to resist sudden and severe shocks attendant upon the firing of heavy guns.

As previously stated, the internal construction of the deflection transmitter is substantially the same as that of the range transmitter described, and no further description thereof will be necessary.

Referring to Figs. 7, 8 and 9, the receiver elements comprising the range receiver, deflection receiver and battle order indicator are preferably mounted upon the same base-plate 136 and within the same casing, the cover for which 137 is shown removed in Fig. 7. The motive devices for the range and deflection receivers are shown as arranged in the four corners of the casing with their respective actuated indicating mechanism between the same. The motive devices being of the same construction, a description of only one will be necessary.

Referring to Figs. 7 and 8 and also 14, there is provided for each motive device an armature 138. The latter is provided with three arms as represented in Figs. 8 and 14, and is mounted to turn with the armature shaft 139, being normally held against the abutment 140 by means of the three coiled springs 141 (see Fig. 13) secured to the three-armed actuator 142, the latter attached to the end of the armature shaft 139.

On either side of the armature are wound concentric with the armature shaft 139 and in a plane transverse thereto the stationary exciting coils 143. These coils are each contained within a preferably soft iron field 144, the latter composed of a core 144ᵃ, through which the armature shaft passes, three separated radial end pieces 144ᵇ (see Figs. 13 and 14 for end elevation) and the three bridge pieces 144ᶜ shown, the bridge pieces of the two opposite coils being joined by the cap pieces 144ˣ (Fig. 7). The armature lies normally with its arms in the open space between the bridge pieces. The coils are wound in opposition so that when current passes through the same the magnetic lines are forced from the bridge and cap pieces centrally toward the core and armature shaft and the armature 138 is attracted from the full line position shown in Fig. 14 to the dotted line position also shown, where it lies directly between the bridge and under the cap pieces. Abutments 145 are provided which limit the armature movement. This form of actuating device for the indicator is quick acting and powerful, and at the same time, being symmetrical and balanced against displacement by changes in gravity or sudden shocks, is practically immune from responding to any shock or jar or false signal. This gives it great practical advantage, though, as with the transmitter and other instruments, it is to be understood that the invention as to its broad features, as well as to certain specific features thereof, is independent of the detailed construction of the instruments.

In moving from the full line position to the dotted line position in Fig. 14, the three-armed actuator 142 at the end of the armature shaft operates the indicator through actuating mechanism, herein of the ratchet and pawl type. The latter may be of any desired or suitable construction to serve the purpose of this invention, although that shown by the drawings has certain broad features of utility and novelty. The ratchet and pawl mechanism is substantially the same for the four motive devices and it will be necessary to describe one only.

Referring to Figs. 11–13 where I have shown in detail the ratchet mechanism for the motive device and for the range receiver, the pawl 146 is pivotally mounted upon an arm 147, the latter secured to swing loosely about the indicator shaft 148. One end of the pawl has an open, out-turned slot which is engaged by a pin 149, the latter carried by an arm 150, secured to the three-arm actuator 142. Normally the pawl is held out and away from the ratchet wheel 151 by the pressure of the pin 149 and the three-arm actuator, as represented in Fig. 11, but, on movement of the actuator, the pawl is first drawn inward about its pivot as represented in dotted lines (Fig. 12), so that a tooth on the ratchet wheel is engaged by a notched recess on the inner edge of the pawl. Further movement of the actuator swings the pawl and the ratchet wheel to the full line position shown in Fig. 12, while return movement of the actuator causes the pin to lift the pawl out and effect release thereof from the ratchet wheel, as shown in Fig. 12, the pawl then swinging back to the position shown in Fig. 11 as the springs 141 draw the actuator back.

Movement of the ratchet wheel for any cause other than engagement by its pawl is prevented by the pivoted spring-pressed locking finger 152, which normally prevents the forward movement of the wheel. On the initial movement of the pawl, however, the heel 153 of the pawl swings out against the locking finger and lifts the latter just far enough to clear the next tooth, after which the finger again drops against the ratchet. That is to say, as the locking finger moves out of engagement with the ratchet wheel, the moving pawl engages therewith and starts the movement of the wheel. The parts are so adjusted, however, that the first movement of the pawl when engaged by the actuator arm is about its pivotal support and before the locking pawl can be disengaged the moving pawl becomes engaged with the ratchet.

In order to prevent the pawl from being thrown forward, without having first the inward movement which results in engagement with the ratchet wheel, as well as to prevent the pawl from being thrown out of engagement with the ratchet after it has started, but before completing, its movement, which latter might occur from some sudden and severe shock or jar, as by the firing of a gun, the guide lock 153× is provided, which latter is pivoted to the frame and drawn inward toward the locking finger 152 by means of the spring 154. The guide lock 153× is provided with a curved edge 155 along which the out-turned tooth 156 upon the pawl moves and by means of which engagement between the pawl and ratchet is enforced during movement of the pawl.

In the normal position of the parts, as shown in Fig. 11, the tooth 156 lies against a shoulder on the guide lock, so that it is incapable of a forward movement without first executing an inward or engaging movement. The tip of the guide lock normally engages a pivoted notched bar 157 which is thrown toward the guide lock by the spring 158. The guide lock itself is therefore locked in position until the pawl has completed its stroke, whereupon the side of the pawl tooth 156 strikes the notched bar 157 (see Fig. 12). This swings the bar out and releases the guide lock, so that it can rise as the pawl is lifted (see Fig. 13), permitting the latter to move back into the position shown in Fig. 11, whereupon the end of the block again snaps into the notched bar 157.

Each end of the indicator shaft 148 is attached to a ratchet wheel operated by ratchet mechanism of substantially the same construction, though reversely arranged, so that the one serves at each movement to turn the indicator shaft one step in one direction, while the other serves to turn the same one step in an opposite direction.

The indicating devices in the illustrated embodiment of the invention are in the form of indicating or counter-wheels, displaying each on its face a series of numeral characters. Referring first to the deflection receiver (Figs. 7, 9 and 18) there are employed for right-hand deflections a wheel 159 for "units", and a second wheel 160 for "tens" side by side therewith. For left-hand deflections there are likewise employed a wheel 161 for "units" and a wheel 162 for "tens". Each of said wheels has the ten numerals 0, 1, 2 . . . 9 displayed upon its face (see Fig. 18), these numerals being adapted to come successively in line with apertures formed in the two swinging shutters 163 and 164, so that they may be read through the glass-covered openings 165 (Fig. 9) in the top of the casing. The numerals of one set read one way and the numerals of the other set in the opposite way, so that, when the indicator shaft is turned one way, the right-hand indication increases, and the left-hand indication decreases, and, when turned in the opposite way, the reverse is true. The "tens" wheels 160 and 162 are loose on the indicator shaft and the "units" wheels 159 and 161 are pinned to the said shaft, the latter having bearings in suitable frame pieces.

The shutters are employed to permit readings only from one set of indicators according to whether the readings are to the right or left of the neutral or zero position. It is to be understood, however, that a deflection indicator is described merely as illustrative of one receiving element of the system herein broadly claimed and the receiving devices for communicating other signals may be used in place thereof. Moreover, as a deflection receiver, the same may be constructed without the shutters described, and indications made above or below an arbitrarily selected neutral point instead of read as right or left deflections The indicating wheels are so operated by mechanism to be described that, for each actuation of the motive devices, the "units" wheels are moved far enough to bring the next number upon the wheel in reading position, and for each complete revolution of the "units" wheel the "tens" wheel is caused to move one step. The shutters are so arranged that at the neutral position where, all four wheels have the zero marks in reading position, the shutter apertures are in line over the respective zero marks so that the instrument shows no deflection. When, however, the indicator shaft is turned from a neutral position to increase the right deflections the turning of the right "units" wheel one step swings the shutter covering left deflections (shown at the left in Fig. 7) up to obscure the left deflection indicator and display the letter R over the visible numerals. Likewise, changing from the neutral position to increase the left deflection indication swings the other shutter up to display the letter L and obscure the right deflection numerals. Referring now to the mechanism for accomplishing this, the right deflection "units" wheel 159 (Fig. 9) is fast on the indicator shaft 148, so that it is turned one step for each movement of the actuating mechanism. To the inner face of the wheel 159 is secured a disk 166 having a notch 167 (Fig. 17) in its periphery, which notch is adapted to engage once each revolution with a tooth on the star wheel 168, the latter loosely mounted on the counter-shaft 169. Secured at one side of the star wheel is the pinion 170 meshing with a gear secured to or formed by the side of the adjacent "tens" wheel 160, so that each time the notch 167 engages the star wheel the gear and "tens" wheel is moved one step. At other times the edge of the disk 166 rides against the star wheel (see Fig. 17) and prevents its movement.

The teeth of the star wheel form a continuation of every third tooth on the pinion, and at the side of the notch 167 there is formed a lug 171 such that it is in line to engage with the teeth of the pinion and enforce movement of the star wheel into the notch 167 when the disk rides off the star wheel. The notch is so located that the "tens" wheel is moved when the "units" wheel moves to bring the zero mark into reading position in place of the nine, or vice versa. At the opposite side of the indicator the "units" wheel 161 for the left deflections is also fixed on the indicator shaft and works in conjunction with the "tens" wheel 162 through the engaging star wheel 168 and pinion 170 in substantially the same way.

The two shutters are so arranged that when either "tens" wheel passes down below the neutral position, that is to say, from 0 to 9, the movement of the "tens" wheel throws the concentric or partly encircling shutter over, obscuring subsequent indications at that side of the instrument. Taking for example the shutter 164 (Fig. 19) covering right deflections, the same is secured to a sleeve carrying the segmental gear 172 meshing with the gear 173, the latter loose upon the counter-shaft, but secured to a pinion 174 and star wheel 175 both of a construction similar to the pinion 170 and star wheel 168, respectively.

The inner edge of the right deflection "tens" wheel 160 is provided with a notched disk 176, similar to the disk 166, which, on passage of the "tens" wheel from the zero to the nine position, engages the star wheel and through the gear 173 throws the shutter forward in the direction of the arrow, Fig. 19. The instruments may then continue to beat up the left deflection indications, while beating down the right deflection indications (which latter, however, are obscured from view).

At the left side of the indicating mechanism the "tens" wheel 162 for the left deflections in moving from the zero position to the "nine" position, moves the star wheel 177 fast on the counter-shaft 169 and therefore turns the gear 178, also fast on the counter-shaft, this serving to throw the shutter covering the left deflection indicator back, which latter has a segmental gear 179 meshing with the gear 178, the action being similar to the action of the shutter 164.

It will thus be seen that the shutter covering the right deflection indicator is thrown down to display the numerals on the indicating wheels when the right deflection indicator moves from 9–0, and the left deflection indicator moves from 1 to 0, the shutter 163 being thrown down to display left deflections when the left deflection indicator moves from 9 to 0. In order to provide a limit of movement for the indicating mechanism, each shutter is provided with a stop pin 181 secured to the side of the segmental gear. In the down position of the shutter (see Fig. 19) this pin lies against the intermeshing gear 173 or 178, as the case may be, and prevents further movement of the shutter in that direction.

In beating up the right deflection indications, for example, the indicator may be made to show 99, beyond which point, however, it cannot pass, since the "tens" wheel cannot move without moving the shutter 164, and the latter is held stopped by the stop pin 181. In like manner the left deflection indications may be increased to indicate 99, but that indication cannot be passed, owing to the stop upon the shutter 163 covering left deflection indications.

From the foregoing description it will be seen that the deflection indicator has a range of 99 beats above the neutral point and 99 below the same, and if it is attempted to pass these limits the armature of the energized motive device is locked against any effective movement.

From the description of the operation of the deflection indicator, the operation of the range indicator will be readily understood.

The latter (see Figs. 7 and 8) has a fixed "unit" indicating plate 181$^x$ displaying the zero mark. The wheel 182 is fast on the indicator shaft 183 and displays alternately the characters 5 and 0, so that the indications advance in increments of fifty. The wheel 182 moves the "hundreds" wheel 184 through a star wheel and pinion of the same construction as the one described in connection with the deflection receiver. Likewise, the wheel 184 moves the "thousands" wheel 185 and the latter the "ten thousands" wheel 186 at the ratio of 1–10. The indicator is stopped at 20,000 in one direction of movement and at the zero position in the opposite direction of movement by a stop 187 on the "units" wheel 182, which stop comes into engagement with a finger 188 on the counter-shaft 189,—the latter being turned by the star wheel between the indicator wheels 185 and 186, which star wheel is fast on the counter-shaft.

In the foregoing description reference has been made for the sake of clearness to the particular units adopted for indication and other specific details of the particular instruments shown, but it should be understood that the instruments shown are merely illustrative of component parts of the system and may be widely varied as to construction and purposes, as conditions may require.

One feature of advantage, and particularly in connection with the system described, is the limit put upon the range of movement of the indicators in either direction. It will be seen that the range receiver has a possible movement of four hundred beats and the deflection receiver of one hundred and ninety eight. This, in connection with the repeating instruments described, provides means for easily and readily synchronizing two or more receivers, a matter of especial importance where the receivers of one station may at times be grouped with the receivers of another, and at other times with the receivers of still other stations. Under such conditions of circuit changes, the indications of two newly grouped receivers will seldom tally, and, before signals can be sent, all the instruments of the group must be synchronized.

In the system described with reference to Figs. 1 and 2, it is only necessary to beat up the instruments of one class, whether range or deflection receivers, first to the highest limit. This can be quickly done by the auxiliary beating up switch 30, as already described. When any receiver reaches its limit of movement this condition is indicated at its repeater by a failure of the repeater indicator either to advance or to vibrate without advancing, which latter it will continue to do, even though at its limit of indication, so long as the repeater circuit continues to be closed and opened by the movement of the motive device at the receiver. When this point has been reached, that is, when one of the receivers and one of the repeaters has reached its upper limit of movement, the hand switch 9 can be reversed and the instruments beat down to the opposite limit, that is, until the receiver and repeater first reaching their upper limit reach the lower limit, which makes it certain that all receivers are returned to the lower, and, together with the repeaters, thereby synchronized.

In beating the instruments up or down in synchronizing after one repeater or receiver has reached its limit of movement, the repeater is then held against opening the switch controlling circuit to release the relay switch. When this point is reached the relay switch may be released by the operator after each beat by opening the positive circuit to the transmitter at the switch 10 or at a special switch such as 10$^x$.

The three receiving units, $i. e.$ range receiver, deflection receiver and battle order indicator, for convenience are preferably mounted in a single casing, as shown. The construction of the repeating units, $i. e$ the range repeater and the deflection repeater, except as to the controlled contacts, is substantially the same as that already described, with the exception that they are, for reasons previously stated, preferably mounted in separate casings, as represented in Fig. 2. The construction of the controlled contacts for the opposite ends of the deflection and range receivers is represented in Fig. 15, wherein the stationary contacts are shown at 189 and normally bridged by the movable contact 190, which latter is carried by the three-arm actuator 142. The other details of the repeating instruments will be obvious from the description already given.

It will be obvious from the details of the ratchet-actuating mechanism for the receiving instruments, that, if both motive devices for a given receiver are simultaneously actuated, the corresponding pawls will be moved into engagement with their ratchet wheels and the indicating shaft be thereby locked against movement in opposite directions, and no movement of the indicator shaft will take place. It will also be obvious that with the ratchet construction described, the receiver cannot operate to indicate the signal without also repeating the same, nor can the signal be repeated without the indication being displayed at the receiver.

In order that a clear comprehension may be had of the principles underlying this invention, one application thereof to a range telegraph system has been fully described and specific details of practical forms of the instruments have been disclosed, but it is to be understood that this invention is in no sense limited to the application which is here made of the same, or to the mechanical or electrical details of the instruments employed, or to the particular circuiting arrangements shown, but that extensive modifications of and deviations from the same may be availed of without departing from the spirit of the invention.

Claims:

1. A signaling system having means for transmitting a signal, a plurality of receiving means for manifesting each the same signal transmitted by said transmitting means, means adjacent the transmitting means for indicating the manifestation of said signal by each of said receiving means and means for maintaining the transmission means active until the manifestation of said signal has been indicated by each indicating means.

2. In a signaling system the combination with a transmitting device, a plurality of receiving devices electrically controlled from the transmitter, separate repeating devices individually controlled by their respective receivers and means for exercising control upon the transmitter through the repeating devices.

3. The combination with a transmitter, of a plurality of receivers connected in multiple with each other and in series with the transmitter, a repeater for each receiver and connected to be controlled thereby, and means at each repeater multiple with each other and in series with the transmitter for exercising control over the latter.

4. In a signaling system, the combination with a transmitter of a plurality of receivers, means for closing the circuit at the transmitter for actuating the receivers, a repeater separately connected to each receiver, means dependent on the actuation of each receiver for actuating its repeater, and means dependent on the actuation of the last repeater to open the circuit at the transmitter.

5. In a signaling system, the combination with means for transmitting varying signals, of receiving means, means for closing the circuit at the transmitter for actuating the receiver, a repeater connected to the receiver having provision for repeating the signal sent by said transmitter, means dependent on the actuation of the receiver for actuating the repeater, and means dependent on the actuation of the repeater to open the circuit at the transmitter, said circuit being held closed until the actuation of said repeater.

6. A signaling system comprising a transmitter, a receiver for indicating signals sent by transmitter, a manually controlled circuit changing device at the transmitter, an electrically actuated switch controlled by the manually controlled switch for actuating the receiver, and means dependent on the receipt of the signal at the receiver for holding the electrically actuated switch in operative position irrespective of the subsequent movement of the manually controlled switch.

7. A signaling system having a transmitter, a receiver, a circuit-closing device at the transmitter for actuating said receiver, electro-magnetic means at the transmitter for actuating the circuit-closing device, repeating means operated by the receiver, and means at the repeater for exercising control over the electro-magnetic means at the transmitter.

8. A signaling system having a transmitter, a receiver, a circuit-closing device at the transmitter for actuating said receiver, electro-magnetic means at the transmitter for actuating the circuit-closing device, a repeater operated by the receiver, a hand switch controlling the electro-magnetic means and means connected with said receiver for exercising control over said circuit-closing device.

9. A signaling system having a receiver for displaying incremental or decremental indications, a circuit-closing device for actuating the receiver incrementally, a circuit-closing device for actuating the same decrementally, electro-magnetic means for moving said circuit-closing devices, a manually operable member adapted on movement in one direction to actuate said electro-magnetic means to move a switch for incremental actuation of the receiver, and in the other direction for decremental actuation thereof, and means for maintaining said electro-magnetic means active to hold the transmitting circuit closed until the manifestation of the signal at the receiver.

10. A signaling system having a receiver for displaying incremental or decremental indications, a circuit-closing device for actuating the receiver incrementally, a circuit-closing device for actuating the same decrementally, electro-magnetic means for moving said circuit-closing devices, a manually operable member adapted on movement in one direction to actuate said electro-magnetic means to move a switch for incremental actuation thereof, and in the other direction for decremental actuation thereof, repeating means for repeating the indication at the receiver, and means for holding the electro-magnetic means active and the transmitting circuit closed during the transmission of the signal and means set in operation by the repeating means for rendering the electro-magnetic means inoperative.

11. In a signaling system, the combination with transmitting means of receiving means, means for sending different classes of signals from the transmitter to the receiver, and electrically operated means operable on the initial attempt to send signals of either class for rendering the system inoperative for sending those of the other class.

12. In a signaling system the combination with a receiver for incremental or decremental deflections, of a transmitter having means for sending either class of signals and means set in operation by efforts to send one class to render the system inoperative for sending signals of the other class.

13. A signaling system having a transmitter, a receiver, means for sending from said transmitter a plurality of classes of signals and electrically operated means dependent on sending signals of one class for rendering the transmitter inoperative to send signals of the other class until the transmitted signal has been manifested at the receiver.

14. A signaling system having a receiver at the receiving station, circuit-closing means at the sending station and a pair of circuits controlled thereby for transmitting signals of different classes from the same sending station to the receiver and means set into operation on the closing of one circuit to prevent closing of the other circuit until the signal is received.

15. A signaling system having a receiver at the receiving station, a plurality of circuit-closing devices for transmitting signals from the same sending station to the receiver, and means set in operation on the movement of one device to close its controlled circuit to insure the interruption of the circuit controlled by the other.

16. In a signaling system the combination with a receiver at the receiving station, of a pair of circuit closing devices at the sending station for transmitting signals to the receiver, magnet windings controlling each circuit-closing device and means for holding open the circuit through the magnet windings for one circuit-closing device on the movement of the other to a circuit-closing position.

17. In a signaling system the combination with receiving means of transmitting means provided with a controlling device, means for causing a step-by-step change in the indication of the receiving means corresponding to repeated reciprocatory movement of the said device, and auxiliary means to provide continued step-by-step change in the indication of the receiving means with a fixed position of the controlling device.

18. In a signaling system having in combination a step-by-step indicator, a transmitter provided with a reciprocatory controlling device for giving a step-by-step movement to the indicator and following the movement of the controlling device, and auxiliary means for giving a continued step-by-step movement to the indicator following a single movement of the controlling device.

19. In a signaling system the combination with a receiver of a reciprocatory controlling device for actuating said receiver, means providing for a single actuation of the receiver on movement of the controlling device in one direction and auxiliary means providing for successive actuations of the receiver while the controlling device is held in that direction.

20. In a signaling system the combination with an indicator having a step-by-step movement in either direction of a pair of circuits leading to said indicator, circuit closing means to close separately either of said circuits and thereby provide for movement of the indicator in one direction or the other, an auxiliary indicator and means for actuating said auxiliary indicator through the simultaneous closure of said circuits.

21. In a signaling system a receiving station having an indicator, a pair of motive devices for moving the indicator in either direction, a transmitting circuit leading to each motive device, a magnet coil in series with each motive device, an auxiliary indicator inoperative through the energization of said magnet coils singly but actuated through their simultaneous energization and means for closing said transmitting circuits either separately or together.

22. In a signaling system the combination with a receiving station having a pair of indicators adapted each for movement in either direction, a pair of transmitting circuits for the control of each indicator, circuit-closing means for separately closing either one of either pair of circuits at will, an auxiliary indicator and means for simultaneously closing one pair of said circuits to move said auxiliary indicator in one direction or for closing the other pair to move said indicator in the opposite direction.

23. In a signaling system the combination with a transmitting station, of a receiving station a pair of circuits connecting the same, means for displaying one signal at the receiving station through energization of one circuit, means for displaying another signal through energization of the other circuit and means for displaying still a third signal through simultaneous energization of both circuits.

24. In a signaling system the combination with a transmitting station of a receiving device a pair of circuits connecting the receiving device and the transmitting station, a circuit controlling device for controlling the receiving device through said circuits, an auxiliary receiving device also controlled through said circuits, an auxiliary controlling device for said auxiliary receiving device and means for rendering the main controlling device inoperative when the auxiliary controlling device is moved.

25. A signaling system having a step by step indicator, a circuit closing device for actuating the same, electro-magnetic means for actuating said circuit closing device, a hand switch for energizing said electro-magnetic means, and means set in operation by movement of the circuit closing device for making an additional closure of the circuit through said electro-magnetic means independently of the hand switch before closing the circuit for the actuation of said indicator.

26. In a signaling system, the combination with a step-by-step indicator, actuating means for moving the same incrementally or decrementally, a transmitting device for controlling said actuating means, said device being provided with circuit connections to said indicator, a plurality of electro-magnetic circuit-controlling means, an operating member having two fixed positions, means for energizing one of said circuit controlling means only and for moving said indicator one way on movement of said member to one fixed position and for energizing the other of said circuit-controlling means only and moving said indicator the other way on movement of said member to the other fixed position, and means for holding said circuit-controlling means in sending position irrespective of further movement of the operating member but for automatically releasing the same following movement of the indicator.

27. In a signaling system, the combination with a receiving device of a circuit-changing device for causing manifestation of signals at the receiving device, electro-magnetic means to actuate said circuit-changing device, a controller for rendering active or inactive said electro-magnetic means, and separate switch means for rendering said electro-magnetic means inactive irrespective of the subsequent movement of the controller until manifestation of the signal at the receiving end.

28. In a signaling system, the combination with a step by step indicator of a circuit closing device for actuating the same, an actuating coil for moving said circuit closing device, a controller for energizing said actuating coil, means for effecting energizing circuit connections through said actuating coil apart from those effected by said controller on the movement of said circuit closing device, means for deënergizing said actuating coil following the receipt of the signal at the receiving end, a holding coil also operatively related to said circuit closing device, means also for energizing said holding coil on movement of said controller in one direction and for deënergizing the same on movement in the opposite direction, and an auxiliary switch for placing the deënergization of the holding coil also under the control of the signal receiving apparatus.

29. In a signaling system, the combination with a transmitter having a circuit closing device, of a step by step indicator controlled thereby, a repeater controlled by said indicator, a circuit normally closed at said repeater but adapted to be broken at said repeater on the display of the transmitted signal, and means controlled by the breaking of the circuit at the repeater for controlling the circuit closing device.

30. A signaling system having means at the sending end to transmit a signal, means at the receiving end to manifest said signal, means to repeat the signal back and display the same at the sending end only after it has been manifested at the receiving end, means for maintaining the transmitting means active until the manifestation of the signal at the receiving end, but for automatically rendering it inactive on the display of the signal by the repeating means.

31. A signaling system having a receiver for displaying incremental or decremental indications, a transmitter, circuit connections between the same for raising or lowering the indication at the receiver through the control of said transmitter, means to maintain the transmitter active until the required increment or decrement has been effected in the indication, but for automatically rendering it inactive thereupon.

32. A signaling system having transmitting means provided with a circuit-closing device, receiving means for manifesting the signal on the closing of the circuit, and means for preventing the opening of the circuit until the signal is manifested, but for automatically opening the circuit thereupon.

33. In a signaling system, the combination of a transmitter having a circuit-controlling device, electro-magnetic means thereat for holding the same in position to maintain the entire circuit unchanged, a receiver controlled by said circuit-controlling device, repeating means adjacent the transmitter for displaying the signal received at the receiver only after the same has been displayed thereat, and means controlled by the actuation of the repeater for releasing the circuit-controller from its circuit-controlling position.

34. A signaling system having a receiver for displaying incremental changes, a transmitter having a circuit-controlling device for effecting incremental changes at the receiver, electro-magnetic means for moving said circuit-controlling device to an active position and for there holding it, a hand switch for energizing said electro-magnetic device, said electro-magnetic means being held in its active position irrespective of the hand switch, and means dependent on the movement of the receiver and in response to the display of the signal to release the said circuit-controlling device.

35. In a signaling system, the combination with a transmitter having a circuit-controlling switch, a transmitting lever, electromagnetic means to hold said switch in active position for sending a signal irrespective of further movement of said lever, a receiver having a reciprocating actuating device for moving the indicator at the receiver, a circuit closing device operated by the movement of the indicator for releasing said switch when the signal is displayed, said reciprocating actuating device being returnable to its initial position on the release of said switch, and means dependent upon the restoration of the actuating device to its initial position again to energize such switch-moving means, thereby to cause the sending of a continuous succession of signals.

36. A signaling system comprising a transmitter, a receiver for indicating signals sent by the transmitter, said transmitter having a manually controlled circuit-changing device, and an electrically actuated switch controlled by the manually controlled circuit-changing device for actuating the receiver, and means adjacent the transmitter for indicating the same signal as at the receiver and dependent on the receipt of said signal thereat.

37. A signaling system having means at the sending end to transmit a signal, means at the transmitting end to manifest said signal dependent on the receipt of said signal at the receiving end, and means for positively preventing interference with the maintaining of the transmitting means active until the manifestation of the signal at the receiving end.

38. A signaling system having a transmitter, a receiver for indicating signals sent by the transmitter, a repeater for repeating the signals manifested at the receiver and dependent on the manifestation of the signals thereat, a controlling device for said transmitter, the movement of which acts to transmit a signal, and means for maintaining said transmitter active until the receipt of the signal at the repeater, irrespective of movement of said controlling device after the transmission of the signal.

39. A signaling system having a transmitting and a receiving station, established circuits between the transmitting and receiving stations, a transmitting device at the transmitting station having manual controlling means for transmitting signals to the receiving station, and means for automatically positively preventing interference with the maintaining of the transmitter active until the manifestation of the signal at the receiver.

40. A signaling system having a transmitter, a receiver for indicating signals sent by the transmitter, a repeater for repeating the signals manifested at the receiver and dependent on the manifestation of the signals thereat, a controlling device for said transmitter, the movement of which acts to transmit a signal, means for positively preventing interference with the activity of said transmitter until the receipt of the signal at the receiver, and means for automatically rendering the transmitter inactive on the manifestation of the signal at the receiver.

41. A signaling system having a transmitter, a receiver for indicating signals sent by the transmitter, a controlling device for the transmitter, movement of which acts to transmit a signal, means for positively preventing interference with the activity of the transmitter until the receipt of a signal at the receiving end, and means dependent on the manifestation of a signal for automatically rendering the transmitter inactive.

42. A signaling system having a transmitter, a receiver, said transmitter having a circuit-closing device for actuating said receiver and electro-magnetic means for actuating said circuit-closing device, a switch controlling the electro-magnetic means, and a repeater controlled by the receiver also controlling said electro-magnetic means.

43. A signaling system having a receiver for indicating incremental or decremental changes, a transmitter having a plurality of circuits, one of which effects change in indication in one direction and the other in the opposite direction, circuit-controlling means for controlling either of said circuits at will, and means acting on initial movement of said circuit-controlling means to control one of said circuits for rendering it inactive to control the receiver through the other circuit.

44. A signaling system having a receiver for indicating incremental or decremental changes, a transmitter having circuit connections to control said indicator, and provided with a pair of electrically-actuated switches, movement of one of which is adapted to effect an indication at the receiver in one direction, and movement of the other an indication in the opposite direction, controlling means for moving either of said switches at will, and means acting on initial movement of one of said switches for rendering the other inactive for controlling the receiver.

45. In a signaling system, the combination with a transmitter, of a receiver provided with indicating mechanism and controlling magnets therefor, additional indicating means controlled by the receiver magnets for indicating the receipt of a signal thereat, and means controlled by said indicating means positively preventing interruption of the activity of the transmitter until the receipt of a signal.

46. In a signaling system, the combination with a transmitter, of a plurality of receivers connected to be simultaneously actuated by said transmitter, each receiver being provided with electro-magnets, indicating mechanism controlled by said magnets, a repeating instrument for each receiving instrument, comprising electro-magnets and indicating mechanism similar to that at the receiver, circuits connecting the magnets at each repeater with circuit-controlling devices at the corresponding receiver whereby each repeater magnet is energized by the movement initiated by its corresponding receiver magnet, and a circuit-controlling device operated by each repeater magnet and circuits controlled thereby and connected in multiple to the transmitter for the control thereof.

47. In a signaling system, the combination with a transmitter, of a plurality of receivers connected to be simultaneously actuated by said transmitter, each receiver being provided with electro-magnets, indicating mechanism controlled by said magnets, a repeating instrument for each receiving instrument, comprising electro-magnets and indicating mechanism similar to that at the receiver, circuits connecting the magnets at each repeater with circuit-controlling devices at the corresponding receiver whereby each repeater magnet is energized by the movement initiated by its corresponding receiver magnet, said transmitter having an electrically actuated switch for controlling the receivers and electro-magnetic means for holding said switch in an active position, an energizing circuit for said electro-magnetic means connected in multiple to branch circuits at each repeater, and a circuit-controlling device for each repeater magnet adapted on energization of the magnet to cause the opening of the branch energizing circuit at the repeater.

48. In a signaling system, the combination with a transmitter, of a plurality of indicators, electric circuits connecting said transmitter and indicators to cause the simultaneous actuation of each indicator through control of the transmitter, a repeating instrument for each indicator having electro-magnetic actuated means, and means for energizing the same on movement of the indicator at the receiver, said transmitter having an electro-magnetic circuit-controlling device and an energizing circuit for holding the same closed, said energizing circuit being connected in multiple to each repeater, but being normally closed thereat, means for closing the energizing circuit at the transmitter to move said circuit-controlling device, and means for opening the said circuit at each repeater on the actuation thereof through its respective indicator.

49. A signaling system having a transmitting and a receiving station, a circuit-controlling switch at the transmitting station for controlling the signals transmitted to the receiving station, electro-magnetic means for moving said switch, a pair of energizing circuits for said switch-moving means, a controlling member, movement of which to an active position acts to energize the moving means, and means responsive to the display of the signal at the receiving end for breaking one of the energizing circuits, the other circuit being broken only on the movement of the controlling member to an inactive position.

50. A signaling system having a transmitting station, a receiving station, indicating means at the receiving station, an electrically-actuated circuit-controlling switch at the transmitting station, circuits leading to the indicating means and controlled by said switch, electro-magnetic means including a pair of energizing coils for moving said switch, an actuating circuit closing switch for energizing said coils, the resultant movement of the circuit-controlling switch acting to close a circuit through one of said coils independently of said actuating switch whereby the circuit-controlling switch is held active independently of the subsequent movement of said actuating switch, and means dependent on the receipt of the signal at the indicating means for breaking the circuit through said last named coil to release the circuit-controlling switch.

51. A signaling system having a transmitting station, a receiving station, indicating means at the receiving station, an electrically-actuated controlling switch at the transmitting station for controlling the transmission of signals to the receiving station, electro-magnetic means for actuating said switch including a pair of magnet windings, an actuating switch for controlling said electro-magnetic means to move the said circuit-controlling switch to an active position, one of said windings remaining energized while said actuating switch is held in an active position, but deënergized when said switch is withdrawn from an active position, means for closing the circuit through the other of said windings on movement of said circuit-controlling switch to an active position, and means for breaking the circuit through said latter winding dependent on the display of the signal at the indicator.

52. A signaling system having a transmitting and a receiving station, a circuit-controlling switch at the transmitting station for controlling the signals transmitted to the receiving station, electro-magnetic means for moving said switch, a pair of energizing circuits for said switch-moving means, a controlling member, movement of which to an active position acts to energize the moving means, means responsive to the display of the signal at the receiving end for breaking one of said energizing circuits, the other circuit being broken on movement of the controlling member to an inactive position, and additional switching means to place said other circuit also under control of said signal responsive means to be broken simultaneously with said first circuit.

53. A signaling system having a transmitting and a receiving station, indicating means at the receiving station, an electrically actuated controlling switch at the transmitting station for controlling the transmission of signals to the receiving station, electro-magnetic means for actuating said switch including a pair of magnet windings, an actuating switch for controlling said electro-magnetic means to move said circuit-controlling switch to an active position, one of said windings remaining energized while said actuating switch is held in an active position, but deënergized when said switch is withdrawn from an active position, means for closing the circuit through the other of said windings on movement of said circuit-controlling switch to an active position, and additional switching means also for placing the first winding under the control of the said signal responsive means to cause at will the breaking of the circuits at both windings simultaneously.

54. A signaling system having a transmitter and a receiver, the transmitter comprising an electrically-actuated controlling switch, an actuating coil for moving the same and a relatively weaker holding coil, a hand switch for energizing both coils to move the circuit-controlling switch, and means operative on the display of a signal at the receiver for deënergizing the actuating coil only.

55. A signaling system having a transmitter and a receiver, the transmitter comprising an electrically-actuated controlling switch, an actuating coil for moving the same and a relatively weaker holding coil, a hand switch for energizing both coils to move the circuit-controlling switch, means operative on the display of a signal at the receiver for deënergizing the actuating coil only, and circuit-changing means for causing at will the simultaneous deënergization of the holding coil.

56. A signaling system having a receiver provided with an indicator and an actuating magnet, a transmitter having an electrically-actuated circuit closer for energizing said magnet, an actuating coil for said circuit-closer, a holding coil, an actuating switch for energizing both of said coils, an energizing circuit for the actuating coil, means responsive to the energization of the magnet at the receiver for opening the energizing circuit, the same being closed following the deënergization thereof, said holding coil being normally controlled wholly by the said actuating switch, and means for connecting said holding coil also to be deënergized simultaneously with said actuating coil consequent on the energization of the magnet at the receiver thereby to effect continued, successive movements of the apparatus.

57. In a signaling system, the combination with an indicator having a reciprocating actuator to impart a step-by-step movement thereto, an actuating magnet to move said actuator on the energization thereof, said actuator being restored to its normal position on the deënergization of the magnet, an electrically controlled circuit-changing device for energizing the magnet, and means consequent on the energization of the magnet and the movement of the actuator to return the circuit-changing device to an inactive position, said last-named means including means dependent on the deënergization of the magnet and the restoration of the actuator to its normal position to cause the circuit-changing device to move to an active position.

58. A signaling system having a transmitter comprising a pair of circuit-controlling switches, a switch operating magnet for each switch, adapted when energized to move its switch to a circuit-closing position, a hand switch for energizing either of said magnets, said hand switch when moved in one direction acting to close one circuit closing switch and in the opposite direction to close the other, an auxiliary circuit for each switch operating magnet closed by the movement of the circuit-controlling switch and acting to maintain the energization of the switch-operating magnet independently of the movement of the hand switch, a second switch-holding magnet for each of said circuit controlling switches relatively weaker than the switch-operating magnet, having an energizing circuit controlled by the hand switch and acting to hold the controlling switch closed while the hand switch remains in an active position, means for interrupting the energizing circuit of the operating magnet for either controlling switch on the initial closing movement of the other controlling switch, a receiving instrument comprising an indicator adapted to be moved step-by-step in either direction, electromagnets for actuating the same controlled by said circuit-controlling switches, a repeating instrument located adjacent the transmitter for repeating the signal displayed at the receiver, said repeater having indicating mechanism and actuating mechanism similar to the receiver, means at the repeater adapted to break the energizing circuit for the appropriate switch-operating magnet on the energization of the repeating magnet and make the same on the deënergization thereof, circuits connecting the actuating magnets of the repeater with the receiver, means at the receiver to close the repeater-energizing circuits, comprising switches connected to be moved each on the energization of its respective receiver magnet, the said switches each acting to break its respective circuit when its receiver magnet is deënergized, and an auxiliary switch at the transmitter adapted, when moved, to place the energizing circuits for the holding magnets under control of the circuit-breaking means at the repeater, thereby to cause the continuous, successive movements of the indicator while the hand switch is held closed.

59. A signaling system having a transmitter comprising a pair of circuit-controlling switches, a switch-operating magnet for each switch adapted, when energized, to move its switch to a circuit-closing position, a hand switch for energizing either of said magnets, said hand switch when moved in one direction acting to close one circuit closing switch and in the opposite direction to close the other, an auxiliary circuit for each switch operating magnet closed by the movement of the circuit-controlling switch, and acting to maintain the energization of the switch-operating magnet independently of the movement of the hand switch, a second switch-holding magnet for each of said circuit controlling switches relatively weaker than the switch-operating magnet, having an energizing circuit controlled by the hand switch and acting to hold the controlling switch closed while the hand switch is in an active position, a receiving instrument comprising an indicator adapted to be moved step-by-step in either direction, electro-magnets for actuating the same controlled by said circuit-controlling switches, a repeating instrument located adjacent the transmitter for repeating the signal displayed at the receiver, said repeater having indicating mechanism and actuating mechanism similar to the receiver, means at the repeater adapted to break the energizing circuit for the appropriate switch-operating magnet on the energization of the repeating magnet and make the same on the deënergization thereof, circuits connecting the actuating magnets of the repeater with the receiver, means at the receiver to close the repeater-energizing circuits, comprising switches connected to be moved each on the energization of its respective receiver magnet, the said switches each acting to break its respective circuit when its receiver magnet is deënergized, and an auxiliary switch at the transmitter adapted, when moved, to place the energizing circuits for the holding magnets under control of the circuit-breaking means at the repeater, thereby to cause the continuous, successive movements of the indicator while the hand switch is held closed.

60. A signaling system having a transmitter comprising a pair of circuit-controlling switches, a switch operating magnet for each switch adapted, when energized, to move its switch to a circuit-closing position, a hand switch for energizing either of said magnets, said hand switch when moved in one direction acting to close one circuit closing switch and in the opposite direction to close the other, an auxiliary circuit for each switch operating magnet closed by the movement of the circuit-controlling switch and acting to maintain the energization of the switch-operating magnet independently of the movement of the hand switch, a second switch-holding magnet for each of said circuit controlling switches relatively weaker than the switch-operating magnet, having an energizing circuit controlled by the hand switch and acting to hold the controlling switch closed while the hand switch remains in an active position, a receiving instrument comprising an indicator adapted to be moved step-by-step in either direction, electro-magnets for actuating the same controlled by said circuit-controlling switches, a repeating instrument located adjacent the transmitter for repeating the signals displayed at the receiver, said repeater having indicating mechanism and actuating mechanism similar to the receiver, means at the repeater adapted to break the energizing circuit for the appropriate switch-operating magnet on the energization of the repeating magnet and make the same on the deënergization thereof, circuits connecting the actuating magnets of the repeater with the receiver, and means at the receiver to close the repeater-energizing circuits, comprising switches connected to be moved each on the energization of its respective receiver magnet, the said switches each acting to break its respective circuit when its receiver magnet is deënergized.

61. A signaling system having a transmitter comprising a circuit-controlling switch, electro-magnetic means for moving said switch, including a pair of windings, one of which is weaker than the other, a controlling member for energizing the said windings to move the switch, an auxiliary circuit closed by the movement of the switch and acting to maintain the energization of the relatively stronger winding independently of the movement of the switch, said weaker winding having an energizing circuit controlled by the controlling member and acting to hold the switch closed while the controlling member is in an active position, an indicator adapted to be moved step-by-step in either direction, electro-magnetic means for actuating the same controlled by said circuit-controlling switch, a repeating instrument for repeating the signal displayed at the indicator, said repeater having also an actuating magnet, means at the repeater adapted to break the energizing circuit for the stronger winding on the energization of the repeater magnet and make the same on the deënergization thereof, circuits connecting the repeater magnet with the receiver, means at the receiver to close the repeater-energizing circuit on the energization of the receiver magnet, the said circuit being broken when the receiver actuating magnet is deënergized, and auxiliary means to place at will the energizing circuit for the relatively weaker winding under control of the circuit-breaking means at the repeater.

62. A signaling system having a transmitter comprising circuit-controlling means, electro-magnetic means for moving said circuit-controlling means, means for energizing said electro-magnetic-moving means, the latter being caused to remain energized while said controlling means remain in an active position, a receiving instrument comprising an indicator adapted to be moved step-by-step in either direction, electro-magnets for actuating the same, a repeating instrument for repating the signal, said repeater having indicating mechanism and actuating magnets similar to the receiver, means at the repeater adapted to break the energizing circuit for the moving means and make the same on the deënergization thereof, circuits connecting the actuating magnets of the repeater with the receiver, and means at the receiver to close a repeater-energizing circuit on energization of a receiver magnet and to break the circuit when the receiver magnet is deënergized.

63. A signaling system having a transmitter comprising a circuit-controlling switch, electro-magnetic means for moving the same, controlling means for energizing said switch-moving means, a receiving instrument comprising an indicator adapted to be moved step-by-step, a receiver-actuating magnet controlled by said circuit-controlling switch, a repeating instrument having an actuating magnet, means at the repeater for breaking the energizing circuit for the switch-moving means on the energization of the repeater magnet, and making the same on the deënergization thereof, means for deënergizing said switch-moving means on the simultaneous breaking of the energizing circuit at the repeater on the movement of the controlling means to an inactive position, and means at the receiver to close the repeater-energizing circuit on the energization of the receiver magnet and for breaking the same on the deënergization thereof.

64. A signaling system having a transmitter comprising an electro-magnetically-actuated circuit-controlling switch, a controlling member for moving the same to a signal-sending position, said switch remaining in such position while the controlling member is held in its active position, a step-by-step indicator, a step-by-step repeater having a movement dependent on the movement of the indicator, and means for holding the controlling switch in a signal-sending position until the actuation of the repeater consequent on the actuation of the indicator irrespective of the movements of the controlling member, but for permitting the movement of the controlling switch away from the signal-sending position after the actuation of the indicator and the withdrawal of the controlling member to an inactive position.

65. A signaling system having a transmitter comprising a circuit-controlling switch, electro-magnetic means for moving the same, a controlling member for energizing said switch-moving means, an indicator having a ratchet and pawl for giving the same a step-by-step movement, an electromagnet for imparting a feeding movement to the pawl, means for restoring the pawl to its normal position when the magnet is deënergized, a circuit connecting said magnet and said circuit-controlling switch, a repeater having an indicator, actuating mechanism and a magnet similar to the receiver, an energizing circuit for the switch-moving means extending to the repeater and adapted to be broken on feeding movement of the actuating pawl thereat, but to be made on restoration of the pawl to normal position, and means at the receiver to energize the repeater magnet on feeding movement of the receiver pawl and to deënergize the same on restoration of the pawl to its initial position.

66. A signaling system having a transmitter provided with a circuit-closing switch, a switch-moving magnet, a controlling member for closing the magnet circuit to move the switch to an active position, an indicator, an indicator magnet adapted to impart a step-by-step movement to the indicator, said magnet being energized when the switch is closed and deënergized when the same is opened, a repeater, a repeater magnet, the latter being energized or deënergized consequent on the energization or deënergization respectively of the indicator magnet, and means operated by the repeater to open or close the circuit for the switch-moving magnet consequent on the energization or deënergization respectively of the repeater magnet, thereby to allow the switch to move to an open position to deënergize the indicator and repeater magnets and reenergize the switch-moving magnet for the automatic sending of successive signals.

67. A signaling system having a transmitter provided with a circuit-closing switch, a switch-moving magnet, a controlling member for closing the magnet circuit to move the switch to an active position, an indicator, an indicator magnet adapted to impart a step-by-step movement to the indicator, said magnet being energized when the switch is closed and deënergized when the same is opened, and means consequent on the energization or deënergization respectively of the indicator magnet for opening or closing respectively the circuit for the switch-moving magnet, thereby to allow the switch to move to an open position to deënergize the indicator magnet and reënergize the switch-moving magnet for the automatic sending of successive signals.

68. A signaling system having a transmitter provided with a pair of circuit-closing switches, a switch-moving magnet for each switch, controlling means for closing the circuit for either magnet to move its switch to an active position, an indicator, indicator magnets adapted to impart a step-by-step movement to the indicator in opposite directions, each magnet being connected with its respective switch and being energized when the switch is closed and deënergized when the same is opened, and means consequent on the energization or deënergization respectively of either indicator magnet to open or close respectively the circuit for the corresponding switch-moving magnet thereby to allow such switch to move to an open position to deënergize the indicator magnet and reënergize the switch-moving magnet for the automatic sending of successive signals.

69. A signaling system having a transmitter provided with a circuit-closing switch, a switch moving magnet, a controlling member for closing the magnet circuit to move the switch to an active position, an indicator, an indicator magnet adapted to impart a step-by-step movement to the indicator, said magnet being energized when the switch is closed and deënergized when the same is opened, a second energizing circuit for the switch moving magnet adapted to be opened or closed by movement of the switch to an inactive or active position respectively, and means consequent on the energization or deënergization of the indicator magnet for breaking or making respectively the said second magnet-energization circuit.

70. A signaling system having a transmitter provided with a signal-sending switch adapted to be moved to an active or inactive position, electro-magnetic means for moving the same, controlling means for controlling said electro-magnetic means, an indicator, indicator-actuating means for imparting a step-by-step movement to the indicator and adapted to be rendered active or inactive as said switch is held in an active or inactive position respectively, a repeater, repeater-actuating means, the latter being rendered active or inactive as the indicator-actuating means is rendered active or inactive respectively, and means consequent on the activity or inactivity of the repeater to deënergize or energize respectively the switch-moving means thereby to allow the switch to move to an inactive position to render the indicator and repeater-actuating means inactive and reënergize the switch-moving means for the automatic sending of successive signals.

71. An electrical power transmission system having transmitting means for electrically reproducing a movement, electrically connected follower means responsive to such movement, means for automatically maintaining said transmitting means active, but for automatically rendering it inactive on response of said responsive means to said movement.

72. The combination with an electro-magnetic step-by-step motive device, of an electro-magnetically controlled circuit closer for energizing said device, a circuit controller for said circuit closer, holding means for energizing the latter independently of the controller on movement of the circuit closer to a circuit closing position, and means at the motive device for deënergizing the holding means on responsive movement of the motive device.

73. In a power transmission system the combination with a main circuit closer, a transmission switch, magnetic means controlled by said main circuit closer for moving said switch and holding it in an active position, a reciprocatory step-by-step motive device energized by the movement of said switch, means for energizing the switch controlling means on movement of the switch to an active position independently of the main circuit closer, means for deënergizing said controlling means on responsive movement of the motive device and means for moving said motive device to its initial position on movement of the switch to an inactive position.

74. A power transmission system having means for effecting incremental and decremental changes of movement, a transmitter having circuit connectiors to control said motive means and provided with a pair of electrically actuated switches, movement of one of which is adapted to effect movement of said motive means in one direction and movement of the other to effect movement of said motive means in the opposite direction, controlling means for said switches and means acting on the initial movement of one of said switches for rendering the other inactive for controlling the motive means.

75. In a signaling system, the combination with an indicator having means for displaying in succession a series of symbols, a distant transmitting device having electrical means for causing the movement of said indicator, a repeater for repeating the same symbol at the transmitting device dependent on the display thereof at the receiver, and means for preventing the sending of a further signal to the receiver until the said signal has been received at the repeater.

76. In a signaling system, the combination with a numerical indicator having means for displaying a succession of numerical symbols, a distant transmitting device having electrical means for causing either the incremental or decremental movement of said indicator, a repeater for repeating the same numerical symbol at the transmitting device dependent on the display thereof at the receiver, and means for preventing the sending of a further signal to the receiver until the said signal has been received at the repeater.

In testimony whereof, we have signed our names to this specification, in the presence of two subscribing witnesses.

HENRY C. WILSON.
CHARLES R. B. CLAFLIN.

Witnesses:
THOMAS B. BOOTH,
FREDERICK L. EMERY.